US012493377B2

(12) United States Patent
Shan et al.

(10) Patent No.: US 12,493,377 B2
(45) Date of Patent: Dec. 9, 2025

(54) METHOD FOR ADJUSTING TOUCH PANEL SAMPLING RATE AND ELECTRONIC DEVICE

(71) Applicant: Honor Device Co., Ltd., Shenzhen (CN)

(72) Inventors: Shuangshuang Shan, Shenzhen (CN); Wei Li, Shenzhen (CN); He Shen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 12 days.

(21) Appl. No.: 18/029,713

(22) PCT Filed: Apr. 29, 2022

(86) PCT No.: PCT/CN2022/090389
§ 371 (c)(1),
(2) Date: Mar. 31, 2023

(87) PCT Pub. No.: WO2023/279820
PCT Pub. Date: Jan. 12, 2023

(65) Prior Publication Data
US 2023/0367418 A1 Nov. 16, 2023

(30) Foreign Application Priority Data
Jul. 7, 2021 (CN) .......................... 202110767893.2

(51) Int. Cl.
*G06F 3/041* (2006.01)
*A63F 13/2145* (2014.01)
(Continued)

(52) U.S. Cl.
CPC ...... *G06F 3/04166* (2019.05); *A63F 13/2145* (2014.09); *A63F 13/22* (2014.09);
(Continued)

(58) Field of Classification Search
CPC .......... G06F 1/32; G06F 1/324; G06F 1/3243; G06F 1/3262; G06F 11/3041;
(Continued)

(56) References Cited

U.S. PATENT DOCUMENTS 5,977,957 A * 11/1999 Miller ....................... G06F 1/32
178/20.01
10,579,129 B2 3/2020 Zhang et al.
(Continued)

FOREIGN PATENT DOCUMENTS

CN 1257590 A 6/2000
CN 102902349 A 1/2013
(Continued)

OTHER PUBLICATIONS

Doa-Yuan Shan et al; "Research and implementation of a virtual joypad based on Android"; Proceedings of 2011 International Conference on Computer Science and Network Technology; Dec. 24, 2011; 4 pages.
(Continued)

*Primary Examiner* — Lawrence S Galka
(74) *Attorney, Agent, or Firm* — Slater Matsil, LLP

(57) ABSTRACT

Embodiments of this application provide a method for adjusting a touch panel (TP) sampling rate and an electronic device and relate to the field of terminal technologies. The method is applicable to an electronic device, where the electronic device includes a TP and a first application is installed on the electronic device. The method may include: scanning a touch operation on the TP by adopting a first sampling rate under a first application scenario of the first application; and under the condition that the application scenario of the first application is switched from a first application scenario to a second application scenario, scanning the touch operation on the TP by adopting a second
(Continued)

sampling rate, wherein the first application scenario is different from the second application scenario, and the first sampling rate is different from the second sampling rate.

20 Claims, 16 Drawing Sheets

(51) Int. Cl.
*A63F 13/22* (2014.01)
*G06F 3/04847* (2022.01)
*G06F 3/0488* (2022.01)
*G06F 9/451* (2018.01)

(52) U.S. Cl.
CPC ........ *G06F 3/04847* (2013.01); *G06F 3/0488* (2013.01); *G06F 9/451* (2018.02)

(58) Field of Classification Search
CPC .......... G06F 3/04166; G06F 3/041661; G06F 9/44505; G06F 9/451; G06F 9/5094; H04N 21/4436
See application file for complete search history.

(56) References Cited

U.S. PATENT DOCUMENTS

| | | |
|---|---|---|
| 11,169,638 B2 | 11/2021 | Wu |
| 11,409,547 B2 | 8/2022 | Chen et al. |
| 2014/0176450 A1* | 6/2014 | Chang ................. G06F 3/04166 345/173 |
| 2014/0176451 A1 | 6/2014 | Chang |
| 2015/0193031 A1* | 7/2015 | Tilak ..................... G06F 3/0416 345/173 |
| 2016/0224180 A1 | 8/2016 | Kim et al. |
| 2016/0267267 A1 | 9/2016 | Hu et al. |

FOREIGN PATENT DOCUMENTS

| | | |
|---|---|---|
| CN | 103207695 A | 7/2013 |
| CN | 103235664 A | 8/2013 |
| CN | 103809884 A | 5/2014 |
| CN | 106445235 A | 2/2017 |
| CN | 107422913 A | 12/2017 |
| CN | 107508994 A | 12/2017 |
| CN | 103207695 B | 1/2018 |
| CN | 108646938 A | 10/2018 |
| CN | 110209301 A | 9/2019 |
| CN | 110262692 A | 9/2019 |
| CN | 111880681 A | 11/2020 |
| CN | 113721785 A | 11/2021 |
| EP | 3407162 A1 | 11/2018 |
| WO | 2020211701 A1 | 10/2020 |

OTHER PUBLICATIONS

S Vishwa Kiran; "Cloud enabled 3D tablet design for medical applications"; 2014 9th International Conference on Industrial and Information Systems (ICIIS); Dec. 15-17, 2014; 6 pages.

* cited by examiner

S908. Determine that a game scenario type changes or the on/off state of the performance switch changes S909. Send a type identifier corresponding to the current application scenario and the current on/off state of the performance switch to the touch panel frequency controller S910. Determine the target TP sampling rate according to the identifier of the current application, the preset list, the type identifier corresponding to the current application scenario, and the current on/off state of the performance switch S706. Send the TP sampling rate adjustment instruction to the touch panel driver, where the TP sampling rate adjustment instruction includes the target TP sampling rate S707. Perform TP scanning according to the target TP sampling rate

FIG. 11B

METHOD FOR ADJUSTING TOUCH PANEL SAMPLING RATE AND ELECTRONIC DEVICE

CROSS-REFERENCE TO RELATED APPLICATIONS

This application is a national stage of International Application No. PCT/CN2022/090389 filed on Apr. 29, 2022, which claims priority to Chinese Patent Application No. 202110767893.2 filed on Jul. 7, 2021. The disclosures of both of the aforementioned application are hereby incorporated by reference in their entireties.

TECHNICAL FIELD

Embodiments of this application relates to the field if terminal technologies, and in particular, to a method for adjusting a touch panel sampling rate and an electronic device.

BACKGROUND

A user may input a touch operation to a touch panel of an electronic device. A touch sensor in the touch panel (touch panel, TP) receives the touch operation inputted by the user, and the touch sensor may trigger a touch panel driver to scan the touch operation to obtain a touch parameter generated by the touch operation. A quantity of times of scanning by the touch panel driver per unit time may be referred to as a TP sampling rate. Generally, a higher TP sampling rate indicates better gesture-following performance of the TP.

If the touch panel driver of the electronic device always scans a touch input at a relatively high TP sampling rate, it will cause the electronic device to be continuously in a high power consumption state. If the touch panel driver always scans the touch input at a relatively low TP sampling rate, in some scenarios (for example, a game scenario), it may cause relatively poor gesture-following performance, resulting in poor user experience. Therefore, how to adjust the TP sampling rate has been a problem urgently required to be resolved at present.

SUMMARY

Embodiments of this application provide a method for adjusting a TP sampling rate and an electronic device. A TP sampling rate can be adjusted according to an adjustment requirement of a user for the TP sampling rate and an actual requirement of running a first application for the TP sampling rate, so that the adjusted sampling rate meets the requirements of the user and the first application for the TP sampling rate, to improve satisfaction of the user on gesture-following performance of the electronic device.

To achieve the foregoing objective, the following technical solutions are used in this application:

According to a first aspect, this application provides a method for adjusting a TP sampling rate, applicable to an electronic device, where the electronic device includes a TP and a first application is installed on the electronic device. The method may include: first starting the first application, and obtaining an identifier of the first application; then receiving a first operation inputted by a user, where the first operation corresponds to a performance switch control; obtaining a status of the performance switch control in response to the first operation; determining a TP sampling rate as a first sampling rate according to the identifier of the first application in a case that the status of the performance switch control changes; and finally scanning a touch operation on the TP based on the first sampling rate.

It may be understood that after starting the first application, if the electronic device receives the first operation inputted by the user for the performance switch control, the electronic device obtains the status of the performance switch control. If the status of the performance switch control changes, it indicates that the first operation inputted by the user is used for adjusting performance of the electronic device. Further, in a case that the status of the performance switch control changes, the electronic device may determine the TP sampling rate as the first sampling rate according to the identifier of the first application obtained when the first application is started. That is, the user may trigger the electronic device to adjust the TP sampling rate by using the performance switch control.

Then, because different applications have different requirements on gesture-following performance of the electronic device, the gesture-following performance of the electronic device is related to the TP sampling rate. Therefore, it may be learned that different applications have different requirements for the TP sampling rate. For example, a game application has a higher requirement for the TP sampling rate than a communication application. Further, in a case that the user triggers adjustment of the TP sampling rate, the electronic device may further determine the TP sampling rate as the first sampling rate according to the identifier of the first application.

Based on the foregoing, by using the method provided in the embodiments of this application, the electronic device receives and responds to an adjustment requirement of the user for the TP sampling rate and can further consider an actual requirement of the first application for the TP sampling rate to adjust the TP sampling rate as the first sampling rate. The adjusted first sampling rate meets the requirements of the user and the first application for the TP sampling rate, to improve satisfaction of the user on the gesture-following performance of the electronic device.

In a possible implementation, before the receiving a first operation inputted by a user, the method further includes: first displaying a first interface of the first application; and then receiving and responding to a second operation inputted by the user, and displaying the performance switch control on the first interface.

In the design manner, the electronic device may provide, by using the performance switch control, an entry for triggering the electronic device to adjust the TP sampling rate for the user. Then, the user may further set the status of the performance switch control to be on or off according to the requirement of the user for the TP sampling rate. For example, the user may set the status of the performance switch control to be on when requiring a relatively high TP sampling rate; or the user may set the status of the performance switch control to be off when requiring a relatively low TP sampling rate.

In a possible implementation, after the starting the first application, the method further includes: determining, when it is detected that an application scenario of the first application is switched from a first application scenario to a second application scenario, that the application scenario of the first application changes, where the first application scenario corresponds to a first application scenario type, and the second application scenario corresponds to a second application scenario type; determining that an application scenario type of the first application changes; storing the second application scenario type; determining the TP sampling rate as a second sampling rate according to the identifier of the first application, the second application scenario type, and the status of the performance switch control; and finally scanning the touch operation on the TP based on the second sampling rate.

It may be understood that application scenarios of different types of the first application may have different requirements for the TP sampling rate. For example, a battle scenario in a game application has a relatively high requirement for the TP sampling rate and a non-battle scenario has a relatively low requirement for the TP sampling rate. Therefore, after the electronic device starts the first application, if the application scenario of the first application is switched from the first application scenario to the second application scenario, and it is detected that the application scenario type of the first application changes, it indicates that the requirement of the first application for a value of the TP sampling rate changes, the electronic device may determine the TP sampling rate as the second sampling rate according to the identifier of the first application, the second application scenario type, and the status of the performance switch control.

Specifically, if a requirement of an application scenario belonging to the first application scenario type for the TP sampling rate is less than a requirement of an application scenario belonging to the second application scenario type for the value of the TP sampling rate, the electronic device may set a relatively small second sampling rate. If the requirement of the application scenario belonging to the first application scenario type for the value of the TP sampling rate is greater than the requirement of the application scenario belonging to the second application scenario type for the value of the TP sampling rate, the electronic device may set a relatively large second sampling rate.

Therefore, different values are set for the TP sampling rate for application scenarios of different types, to meet requirements of the application scenarios of different types for the TP sampling rate and avoid non-necessary power consumption.

In a possible implementation, the application scenario type includes a battle scenario and a non-battle scenario, the first application scenario type is the non-battle scenario, and the second application scenario type is the battle scenario.

In the design manner, two application scenario types, that is, the battle scenario and the non-battle scenario, included in the game application are described. A case that after the game application is started, the game application changes from the non-battle scenario to the battle scenario is further described.

In a possible implementation, after the obtaining an identifier of the first application, the method further includes: determining that the electronic device supports adjustment of the TP sampling rate; determining whether a type of the first application is a game application type based on the identifier of the first application; determining, according to the identifier of the first application in a case that the type of the first application is the game application type, whether the first application meets a first preset condition; determining the TP sampling rate as a third sampling rate if the first application meets the first preset condition; scanning the touch operation on the TP based on the third sampling rate; determining the TP sampling rate as a fourth sampling rate if the first application does not meet the first preset condition; and scanning the touch operation on the TP based on the fourth sampling rate, where the third sampling rate is greater than the fourth sampling rate; or directly scanning the touch operation on the TP based on a fifth sampling rate if the first application does not meet the first preset condition, where the fifth sampling rate is a sampling rate obtained for the TP sampling rate before the first application is started.

The first preset condition is set based on at least one preset list. The at least one list includes a TP high report list. The TP high report list includes a plurality of application identifiers, and applications corresponding to the plurality of application identifiers in the TP high report list support a TP sampling rate greater than a first threshold.

It may be understood that considering that a requirement of the game application for the TP sampling rate is higher than a requirement of another application (for example, a communication application or a payment application) of a non-game application type for the TP sampling rate, the game application has a larger possibility that the TP sampling rate needs to be adjusted. Therefore, the electronic device first determines whether the type of the first application is the game application type on the premise of supporting adjustment of the TP sampling rate. Then, different game applications have different requirements for the TP sampling rate, and the electronic device may set the first preset condition for determining a specific value of the TP sampling rate to be adjusted for the first application.

Specifically, on the premise that the type of the first application is the game application type (that is, the first application is the game application), the electronic device determines the TP sampling rate as the third sampling rate if the first application meets the first preset condition. The electronic device determines the TP sampling rate as the fourth sampling rate if the first application does not meet the first preset condition; or the electronic device directly scans the touch operation on the TP based on the fifth sampling rate if the first application does not meet the first preset condition.

The fifth sampling rate is a sampling rate obtained for the TP sampling rate before the first application is started, that is, the electronic device does not adjust the value of the TP sampling rate. It may be learned that the electronic device adjusts the TP sampling rate as the fourth sampling rate or does not adjust the TP sampling rate if the first application does not meet the first preset condition. The third sampling rate is greater than the fourth sampling rate. That is, the electronic device adjusts the TP sampling rate as a maximum value (that is, the third sampling rate) when the first application meets the first preset condition. The electronic device adjusts the TP sampling rate as a relatively large value (that is, the fourth sampling rate) or does not adjust the TP sampling rate when the first application does not meet the first preset condition.

The first preset condition is set based on at least one list. The applications corresponding to the plurality of application identifiers in the TP high report list included in the at least one list support the TP sampling rate greater than the first threshold. That is, the first preset condition may include that the first application is in the TP high report list. Further, if the first application is in the TP high report list, it indicates that the first application supports the TP sampling rate greater than the first threshold, and the electronic device adjusts the TP sampling rate as the maximum value, which meets a high requirement of the first application for the TP sampling rate. Further, when the user uses the first application, a problem of freezing caused by a relatively low value of the TP sampling rate is avoided and user experience of the user is improved.

In a possible implementation, the method further includes: obtaining an identifier of a second application in a case that the type of the first application is not the game application type, where the second application is an application running in a foreground of the electronic device before the first application runs in the foreground; then determining, according to the identifier of the second application, whether the second application meets the first preset condition; determining the TP sampling rate as a sixth sampling rate if the second application meets the first preset condition; scanning the touch operation on the TP based on the sixth sampling rate; determining the TP sampling rate as a seventh sampling rate if the second application does not meet the first preset condition; and scanning the touch operation on the TP based on the seventh sampling rate; or scanning the touch operation on the TP based on the fifth sampling rate if the second application does not meet the first preset condition; where the third sampling rate is greater than the sixth sampling rate. The third sampling rate is greater than the seventh sampling rate.

It may be understood that on the premise of supporting adjustment of the TP sampling rate, if the electronic device determines that the type of the first application is not the game application type (that is, the first application is not the game application), it indicates that the TP sampling rate does not need to be adjusted to the third sampling rate or the fourth sampling rate for the first application. However, if a type of the second application running in a foreground before the first application runs in the foreground is the game application type (that is, the second application is not the game application), it indicates that the TP sampling rate may be adjusted to the third sampling rate or the fourth sampling rate for the second application. That is, when the electronic device runs the first application in the foreground, the used value of the TP sampling rate may be the adjusted third sampling rate or fourth sampling rate. Because a higher sampling rate increases power consumption of the electronic device, and the first application does not require a TP sampling rate with a relatively large value, unnecessary power consumption is generated. Therefore, the electronic device may determine whether the second application meets the first preset condition.

Specifically, if the second application meets the first preset condition, it indicates that before the first application runs in the foreground, the TP sampling rate is adjusted to the third sampling rate, and the electronic device may determine the TP sampling rate as a sixth sampling rate. The adjusted sixth sampling rate is less than the third sampling rate, so that the unnecessary power consumption may be reduced.

Then, if the second application does not meet the first preset condition, it indicates that before the first application runs in the foreground, the TP sampling rate is adjusted to the fourth sampling rate or the TP sampling rate is not adjusted, and the electronic device may determine the TP sampling rate as the seventh sampling rate or scan the touch operation on the TP based on the fifth sampling rate (that is, does not adjust the TP sampling rate). The adjusted seventh sampling rate is less than the third sampling rate, to avoid relatively high power consumption caused by use of a highest sampling rate. For example, the seventh sampling rate may further be less than the fourth sampling rate, to reduce the power consumption when the first application runs.

In a possible implementation, before the first operation by the user is received, the status of the performance switch control may be an off state, and the first operation is used for changing the status of the performance switch control from the off state to an on state. In this way, before the receiving a first operation by a user, the determining the TP sampling rate as a second sampling rate according to the identifier of the first application, the second application scenario type, and the status of the performance switch includes: determining the TP sampling rate as the second sampling rate according to the identifier of the first application, the second application scenario type, and the off state of the performance switch control.

In the design manner, a possibility of the status of the performance switch control before the electronic device receives the first operation by the user is described, that is, the status of the performance switch control is the off state, and the status is changed from the off state to the on state by using the first operation. Similarly, before the first operation by the user is received, the status of the performance switch control may be the on state, and the status is changed from the on state to the off state by using the first operation.

In a possible implementation, before the first operation by the user is received, the status of the performance switch control may be an off state, and the first operation is used for changing the status of the performance switch control from the off state to an on state. Further, the obtaining a status of the performance switch control in response to the first operation specifically includes: obtaining the status of the performance switch control as the on state in response to the first operation. In this way, before the receiving a first operation by a user, the determining the TP sampling rate as a second sampling rate according to the identifier of the first application, the second application scenario type, and the status of the performance switch includes: determining the TP sampling rate as the second sampling rate according to the identifier of the first application, the second application scenario type, and the on state of the performance switch control.

In the design manner, a case that the status of the performance switch control is the off state before the electronic device receives the first operation by the user is described. The electronic device obtains the status of the performance switch control as the on state in response to the first operation. In addition, after the first operation, the electronic device determines the TP sampling rate as the second sampling rate by using the on state of the performance switch control.

In a possible implementation, the determining the TP sampling rate as a second sampling rate according to the identifier of the first application, the second application scenario type, and the status of the performance switch control includes: determining that the electronic device supports adjustment of the TP sampling rate; determining whether the type of the first application is the game application type based on the identifier of the first application; determining the TP sampling rate as an eighth sampling rate if it is determined that the identifier of the first application, the second application scenario type, and the status of the performance switch control meet a second preset condition; determining the TP sampling rate as a ninth sampling rate if it is determined that the identifier of the first application, the second application scenario type, and the status of the performance switch control meet a third preset condition, where the eighth sampling rate is greater than the ninth sampling rate; determining the TP sampling rate as a tenth sampling rate if it is determined that the identifier of the first application, the second application scenario type, and the status of the performance switch control meet a fourth preset condition, where the eighth sampling rate is greater than the tenth sampling rate; and determining the TP sampling rate as an eleventh sampling rate if it is determined that the identifier of the first application, the second application scenario type, and the status of the performance switch control meet a fifth preset condition, where the eighth sampling rate is greater than the eleventh sampling rate.

It may be understood that different game applications have different requirements for the TP sampling rate, application scenarios of different types have different requirements for the TP sampling rate, and different statuses of the performance switch control also indicate that the user has different requirements for the TP sampling rate. Therefore, the electronic device may set the second preset condition, the third preset condition, the fourth preset condition, and the fifth preset condition for a combination of the identifier of the first application, the second application scenario type, and the status of the performance switch control. Further, if the combination meets different preset conditions, the TP sampling rate is adjusted to different values (for example, the eighth sampling rate, the ninth sampling rate, the tenth sampling rate, and the eleventh sampling rate). The TP sampling rate may be adjusted finely.

Then, the electronic device adjusts the TP sampling rate based on the requirement of the first application for the TP sampling rate, the requirement of the second application scenario type for the TP sampling rate, and the requirement of the user for the TP sampling rate. The value of the adjusted TP sampling rate can meet the requirement of the first application for the TP sampling rate to a certain extent, also meet the requirement of the second application scenario type for the TP sampling rate, and further meet the requirement of the user for the TP sampling rate. Therefore, the satisfaction of the user for the gesture-following performance when using the first application on the electronic device may be improved.

In a possible implementation, the second preset condition includes that: the identifier of the first application is not in a first list, the identifier of the first application is in a second list, and the second application scenario type is a battle scenario; or the second preset condition includes that: the identifier of the first application is not in a first list, the identifier of the first application is not in a second list, the identifier of the first application is in a third list, the status of the performance switch control is an on state, and the second application scenario type is a battle scenario.

The third preset condition includes that: the identifier of the first application is not in the first list, the identifier of the first application is in the second list, and the second application scenario type is a non-battle scenario; or the third preset condition includes that: the identifier of the first application is not in the first list, the identifier of the first application is not in the second list, the identifier of the first application being in the third list, the status of the performance switch control is the on state, and the second application scenario type is a non-battle scenario.

The fourth preset condition includes that: the identifier of the first application is in the first list, and the second application scenario type is the battle scenario; or if it is determined that the identifier of the first application is not in the first list, the identifier of the first application is not in the second list, the identifier of the first application is not in the third list, and the second application scenario type is the non-battle scenario; or the fourth preset condition includes that: the identifier of the first application is not in a first list, the identifier of the first application is not in a second list, the identifier of the first application is in the third list, the status of the performance switch control is an off state, and the second application scenario type is the battle scenario.

The fifth preset condition includes that: the identifier of the first application is in the first list, and the second application scenario type is the battle scenario; or if it is determined that the identifier of the first application is not in the first list, the identifier of the first application is not in the second list, the identifier of the first application is not in the third list, and the second application scenario type is the non-battle scenario; or the fifth preset condition includes that: the identifier of the first application is not in the first list, the identifier of the first application is not in the second list, the identifier of the first application is in the third list, the status of the performance switch control is the off state, and the second application scenario type is the non-battle scenario.

The first list includes a plurality of application identifiers, and applications corresponding to the plurality of application identifiers in the first list have low requirements for gesture-following performance. The second list includes a plurality of application identifiers, and applications corresponding to the plurality of application identifiers in the second list support a TP sampling rate greater than a first threshold. The third list includes a plurality of application identifiers, and applications corresponding to the plurality of application identifiers in the third list support adjustment of the TP sampling rate by using the performance switch control.

In the design manner, an implementation of the second preset condition, the third preset condition, the fourth preset condition, and the fifth preset condition set by the electronic device for the combination of the identifier of the first application, the second application scenario type, and the status of the performance switch control is described.

In a possible implementation, the electronic device further includes: a system service, a gesture-following performance control application, and a gesture-following performance control service. The gesture-following performance control service includes a manager and a touch panel frequency controller. When the first application is started, the first application registers application information with the system service, where the application information includes the identifier of the first application. Then, the gesture-following performance control application obtains the identifier of the first application from the system service. The gesture-following performance control service sends the identifier of the first application to the touch panel frequency controller. Finally, the touch panel frequency controller may determine, according to the identifier of the first application and the at least one preset list, whether the TP sampling rate is adjusted.

In the design manner, an implementation in which the electronic device may set some modules to perform some steps of adjusting the TP sampling rate is described.

In a possible implementation, the electronic device further includes a TP driver, and the first application includes a first listening interface. First, the manager registers listening with the first listening interface. Then, after the first application is started, when detecting that the application scenario of the first application is switched from the first application scenario to the second application scenario, the first application determines that the application scenario of the first application changes, where the first application scenario corresponds to the first application scenario type, and the second application scenario corresponds to the second application scenario type. The first application sends the second application scenario to the manager through the first listening interface. The manager determines that the application scenario type of the first application changes. The manager stores the second application scenario type. The manager further sends the second application scenario type and the status of the performance switch to the touch panel frequency controller. Then, the touch panel frequency controller determines the TP sampling rate as the second sampling rate according to the identifier of the first application, the second application scenario type, and the status of the performance switch control. The touch panel frequency controller may send the second sampling rate to the TP drive. Finally, the TP drive scans the touch operation on the TP based on the second sampling rate.

In the design manner, an implementation in which the electronic device may set some modules to perform some steps of adjusting the TP sampling rate is described.

In a possible implementation, a game assistant application APP is installed on the electronic device, and the game assistant APP includes a second listening interface. First, the manager registers listening with the second listening interface. Then, after the first application is started, the game assistant APP obtains the status of the performance switch control in response to the first operation. The game assistant APP further sends the status of the performance switch control to the manager through the second listening interface. The manager may determine that the status of the performance switch control changes. The manager stores the status of the performance switch control. The manager further sends the status of the performance switch control and the second application scenario type to the touch panel frequency controller. Then, the touch panel frequency controller determines the TP sampling rate as the first sampling rate according to the identifier of the first application, the second application scenario type, and the status of the performance switch control. The touch panel frequency controller further sends the first sampling rate to the TP drive. Finally, the TP drive scans the touch operation on the TP based on the first sampling rate.

In the design manner, an implementation in which the electronic device may set some modules to perform some steps of adjusting the TP sampling rate is described.

In a possible implementation, the at least one preset list further includes: a first list, a fourth list, and a fifth list. The first list includes a plurality of application identifiers, and applications corresponding to the plurality of application identifiers in the first list have low requirements for gesture-following performance. The fourth list includes a plurality of application identifiers, and applications corresponding to the plurality of application identifiers in the fourth list have high requirements for the gesture-following performance. The fifth list includes a plurality of application identifiers, and applications corresponding to the plurality of application identifiers in the fifth list do not support the third sampling rate. The electronic device further includes a TP broad enable switch, and the TP broad enable switch is configured to manage whether the electronic device opens a game special effect. The first preset condition is set based on the at least one list and a status of the TP broad enable switch.

In the design manner, a possibility that the electronic device may set the at least one list used by the first preset condition is described. It may be understood that some factors (for example, a factor strongly correlated to the TP sampling rate and a factor weakly correlated to the TP sampling rate) affecting the TP sampling rate may be included in the at least one list for setting the first preset condition.

For example, when the electronic device further includes the TP broad enable switch, the electronic device may further set the first preset condition in combination with the TP broad enable switch. The TP broad enable switch is configured to manage whether the electronic device opens the game special effect.

According to a second aspect, this application provides a method for adjusting a touch panel TP sampling rate, applicable to an electronic device, where the electronic device includes a TP and the method includes: first receiving a first operation inputted by a user, where the first operation corresponds to a performance switch control; obtaining a status of the performance switch control in response to the first operation; then determining a TP sampling rate as a first sampling rate in a case that the status of the performance switch control changes, where the first sampling rate is different from a sampling rate obtained for the TP sampling rate before the first operation is received; and finally scanning a touch operation on the TP based on the first sampling rate.

It may be understood that after starting a first application, if the electronic device receives the first operation inputted by the user for the performance switch control, the electronic device obtains the status of the performance switch control. If the status of the performance switch control changes, it indicates that the first operation inputted by the user is used for adjusting performance of the electronic device. Further, the electronic device determines the TP sampling rate as the first sampling rate. That is, the user may trigger the electronic device to adjust the TP sampling rate by using the performance switch control.

The first sampling rate is different from a sampling rate obtained for the TP sampling rate before the first operation is receive, and it indicates that when the user triggers to adjust the TP sampling rate, the electronic device adjusts the value of the TP sampling rate in response to a requirement of the user. Therefore, the user indirectly adjusts the TP sampling rate, to improve the user experience.

In a possible implementation, a first application is installed on the electronic device. before the receiving a first operation inputted by a user, the method further includes: starting the first application; and obtaining an identifier of the first application; and the determining a TP sampling rate as a first sampling rate includes: determining the TP sampling rate as the first sampling rate according to the identifier of the first application.

It should be noted that for beneficial effects that can be achieved by the design manner, reference may be made to beneficial effects in the first aspect and in a design manner the same as the design manner, and details are not described herein again.

In a possible implementation, before the receiving a first operation inputted by a user, the method further includes: first displaying a first interface of the first application; and then receiving and responding to a second operation inputted by the user, and displaying the performance switch control on the first interface.

It should be noted that for beneficial effects that can be achieved by the design manner, reference may be made to beneficial effects in the first aspect and in a design manner the same as the design manner, and details are not described herein again.

In a possible implementation, after the starting the first application, the method further includes: determining, when it is detected that the application scenario of the first application is switched from the first application scenario to the second application scenario, that the application scenario of the first application changes, where the first application scenario corresponds to the first application scenario type, and the second application scenario corresponds to the second application scenario type; then determining that an application scenario type of the first application changes; storing the second application scenario type; determining the TP sampling rate as a second sampling rate according to the identifier of the first application, the second application scenario type, and the status of the performance switch control; and finally scanning the touch operation on the TP based on the second sampling rate.

It should be noted that for beneficial effects that can be achieved by the design manner, reference may be made to beneficial effects in the first aspect and in a design manner the same as the design manner, and details are not described herein again.

According to a third aspect, this application provides an electronic device, including a touch panel, a memory, and one or more processors. The touch panel and the memory are coupled to the processors. The memory is configured to store computer program code, where the computer program code includes computer instructions. When the processors execute the computer instructions, the electronic device performs the method according to the first aspect and any possible design manner thereof; or when the processors execute the computer instructions, the electronic device performs the method according to the second aspect and any possible design manner thereof.

According to a fourth aspect, this application provides a chip system, applied to an electronic device including a touch panel, where the chip system includes one or more interface circuits and one or more processors. The interface circuits and the processors are interconnected by lines. The interface circuit is configured to receive a signal from a memory of the electronic device and send the signal to the processor, where the signal includes computer instructions stored in the memory. When the processors execute the computer instructions, the electronic device performs the method according to the first aspect and any possible design manner thereof; or when the processors execute the computer instructions, the electronic device performs the method according to the second aspect and any possible design manner thereof.

According to a fifth aspect, this application provides a computer-readable storage medium. The computer-readable storage medium includes computer instructions. The computer instructions, when run on an electronic device, cause the electronic device to perform the method according to the first aspect and any possible design manner thereof; or the computer instructions, when run on an electronic device, cause the electronic device to perform the method according to the first aspect and any possible design manner thereof.

According to a sixth aspect, this application provides a computer program product, where the computer program product, when run on an electronic device, causes the electronic device to perform the method according to the first aspect and any possible design manner thereof; or the computer instructions, when run on an electronic device, cause the electronic device to perform the method according to the second aspect and any possible design manner thereof.

It may be understood that, for beneficial effects that can be achieved by the electronic device according to the third aspect, the chip system according to the fourth aspect, the computer-readable storage medium according to the fifth aspect, and the computer program product according to the sixth aspect provided above, reference may be made to the beneficial effects in the first aspect and any possible design manner thereof and the beneficial effects in the second aspect and any possible design manner, and details are not repeated herein.

BRIEF DESCRIPTION OF THE DRAWINGS

FIG. 11A and FIG. 11B are a fifth flowchart of a method for adjusting a sampling rate of a TP according to an embodiment of this application.

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the quantity of indicated technical features. Therefore, a feature defined by "first" or "second" can explicitly or implicitly includes one or more features. In descriptions of this embodiment, unless otherwise stated, "a plurality of" means two or more.

The following describes implementations of this embodiment in detail with reference to the accompanying drawings.

For example, an embodiment of this application provides a method for adjusting a TP sampling rate applicable to an electronic device with a touch panel such as a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device, or a virtual reality device, which are not limited in this embodiment of this application.

Figure 1:
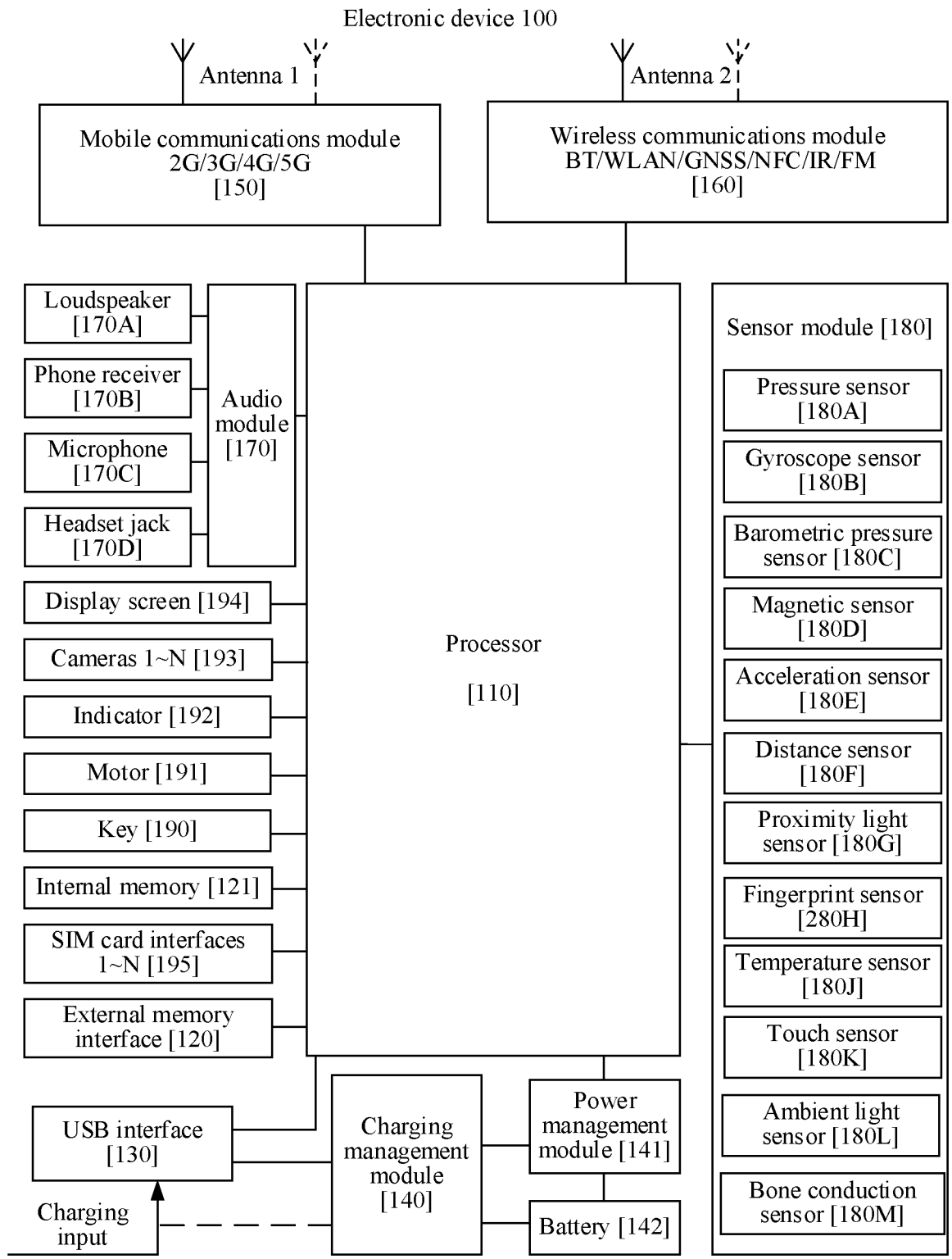
FIG. 1 is a schematic diagram of a hardware structure of an electronic device according to an embodiment of this application.

FIG. 1 is a schematic structural diagram of an electronic device 100 according to an embodiment of this application.

As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment constitutes no specific limitation on the electronic device 100. In some other embodiments, the electronic device 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors.

The controller may be a nerve center and a command center of the electronic device 100. The controller may generate an operation control signal based on an instruction operation code and a timing signal, and read an instruction and control execution of the instruction.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that a schematic interface connection relationship between the modules in this embodiment is merely an example for description, and constitutes no limitation on the structure of the electronic device 100. In some other embodiments, the electronic device 100 may alternatively use an interface connection manner different from that in the foregoing embodiment, or use a combination of a plurality of interface connection manners.

The charging management module 140 is configured to receive a charging input from a charger. The charging management module 140 may supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communication module 160, and the like. In some other embodiments, the power management module 141 may be alternatively disposed in the processor 110. In some other embodiments, the power management module 141 and the charging management module 140 may further be configured in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may also be multiplexed to improve utilization of the antennas. For example, the antenna 1 may be multiplexed as a diversity antenna of a wireless local area network.

The mobile communications module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 170A, the phone receiver 170B, and the like), or displays an image or a video through the display screen 194.

The wireless communication module 160 may provide solutions of wireless communications applied to the electronic device 100, including a wireless local area network (wireless local area network, WLAN) (such as a wireless fidelity (wireless fidelity, Wi-Fi) network) and bluetooth (bluetooth, BT), a global navigation satellite system (global navigation satellite system, GNSS), frequency modulation (frequency modulation, FM), near field communication (near field communication, NFC), and infrared (infrared, IR). The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (satellite based augmentation systems, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render graphics. The processor 110 may include one or more GPUs and execute program instructions to generate or change display information.

The display screen 194 is configured to display an image, a video, and the like. The display screen 194 includes a display panel. The display panel may be a liquid crystal display (liquid crystal display, LCD), a light-emitting diode (light emitting diode, LED) an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like.

In this embodiment of this application, if the display screen 194 is integrated with the touch sensor 180K, the display screen 194 may be a touch screen. The touch sensor 180K may be also referred to as a "touch panel". That is, the display screen 194 may include a display panel and a touch panel. The touch sensor 180K and the display screen 194 form a touchscreen, which is also referred to as a "touch control screen". The touch sensor 180K is configured to detect a touch operation performed on or near the touch sensor 180K. After detecting the touch operation, the touch sensor 180K may trigger a driver (for example, a TP driver) in a kernel layer to periodically scan a touch parameter generated by the touch operation. Then, the driver in the kernel layer transfers the touch parameter to a related module in an upper layer for the related module to determine a touch event type corresponding to the touch parameter.

In addition, the display screen 194 may provide a visual output related to the touch operation. In some other embodiments, the touch sensor 180K may alternatively be disposed on a surface of the electronic device 100 rather than integrated in the display screen 194. In this case, the touch sensor 180K is located on a position different from that of the display screen 194. In this embodiment of this application, a specific process of a method for adjusting a TP sampling rate is described by using an example in which the touch panel is the display screen integrated with the touch sensor.

The electronic device 100 can implement a photographing function by using the ISP, the camera 193, the video codec, the GPU, the display screen 194, the application processor, and the like. The ISP is configured to process data fed back by the camera 193. The camera 193 is configured to capture a static image or a video. The digital signal processor is configured to process a digital signal, and in addition to a digital image signal, may further process another digital signal. The video codec is configured to compress or decompress a digital video. The electronic device 100 may support one or more video codecs. In this way, the head-mounted electronic device 100 may play or record videos in a plurality of encoding formats, for example, moving picture experts group (moving picture experts group, MPEG) 1, MPEG 2, MPEG 3, MPEG 4, or the like.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 100, for example, image recognition, facial recognition, voice recognition, and text understanding.

The external memory interface 120 may be configured to connect to an external storage card such as a micro SD card, to expand a storage capability of the electronic device 100. The external storage card communicates with the processor 110 by using the external memory interface 120, so as to implement a data storage function, such as storing a file such as music or a video in the external storage card. The internal memory 121 may be configured to store computer executable program code, and the executable program code includes an instruction. The processor 110 runs the instruction stored in the internal memory 121, to perform various function applications and data processing of the electronic device 100. For example, in this embodiment of this application, the processor 110 may execute instructions stored in the internal memory 121, and the internal memory 121 may include a program storage region and a data storage region. The program storage area may store an operating system, an application required by at least one function (for example, a sound playing function or an image playing function), and the like. The data storage region may store data (for example, audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS).

The electronic device 100 may implement an audio function by using the audio module 170, the speaker 170A, the telephone receiver 170B, the microphone 170C, the headset jack 170D, the application processor, and the like, such as music playing or recording.

The audio module 170 is configured to convert digital audio information into an analog audio signal output, and is further configured to convert an analog audio input into a digital audio signal. The audio module 170 may be further configured to encode and decode an audio signal. The speaker 170A, also referred to as a "speaker", is configured to convert an audio electrical signal into a sound signal. The telephone receiver 170B, also referred to as a "receiver", is configured to convert an audio electrical signal into a sound signal. The microphone 170C, also referred to as a "microphone" or a "microphone", is configured to convert a sound signal into an electrical signal. The headset jack 170D is configured to connect to a wired headset.

A key 190 includes a power key, a volume key, and the like. The key 190 may be a mechanical key, or a touch-type key. The electronic device 100 may receive a key input, and generate a key signal input related to user setting and function control of the electronic device 100. The motor 191 may generate a vibration prompt. The motor 191 may be configured to provide a vibration prompt for an incoming call, and may be further configured to provide a touch vibration feedback. The indicator 192 may be an indicator light, may be configured to indicate a charging state and a battery change, and may be further configured to indicate a message, a missed call, a notification, and the like. The SIM card interface 195 is configured to connect to a SIM card. The SIM card may be inserted into the SIM card interface 195 or unplugged from the SIM card interface 195, to come into contact with or be separated from the electronic device 100. The electronic device 100 may support one or N SIM card interfaces, and N is a positive integer greater than 1. The SIM card interface 195 may support a Nano SIM card, a Micro SIM card, a SIM card, and the like.

Methods in the following embodiments may all be implemented in the electronic device 100 having the foregoing hardware structure.

Gesture-following performance of the electronic device may be reflected as a time delay T from "a user touches a touch panel of the electronic device by using a finger" to "an image corresponding to a touch operation displayed by the electronic device is perceived by human eyes". A shorter length of the time delay T indicates better gesture-following performance of the electronic device. Better gesture-following performance of the electronic device indicates better user experience of controlling the electronic device through a touch operation by the user and more fluent feeling.

Currently, the gesture-following performance of the electronic device is usually improved by adjusting a screen refresh rate. However, when a touch parameter generated by the touch operation is acquired, if a sampling rate of a touch panel driver is relatively low, it indicates that a speed at which the touch panel driver performs scanning to obtain the touch parameter is relatively low, and a time delay for the electronic device to respond to the obtained touch parameter is relatively long. Further, a speed at which the electronic device responds to the obtained touch parameter and displays the obtained touch parameter is also relatively slow (that is, the time delay T is increased). In this way, even though the electronic device has a relatively high screen refresh rate, a relatively low sampling rate also causes relatively poor gesture-following performance of the electronic device.

Specifically, a touch sensor in the touch panel of the electronic device receives the touch operation by the user, and the touch sensor may trigger the touch panel driver to periodically scan and detect the touch parameter (which includes information such as touch coordinates, a touch force, and a timestamp of the touch operation). Subsequently, the touch panel driver may report the scanned touch parameter to an input system of an application framework layer. The input system parses the touch parameter and determines a focus application according to a current focus; and then sends the parsed information to the focus application. The focus application is an application running in a foreground of the electronic device or an application corresponding to a touch position of the touch operation. The focus application determines a control corresponding to the touch operation according to the parsed information (for example, a report position).

Subsequently, the focus application invokes an image drawing module in a system library by using a view system in the application framework layer to draw an image. The image drawing module renders the drawn image. The focus application sends the rendered image to a cache queue of a display compositing process. The rendered image in the display compositing process is composited into an application interface by using an image compositing module in the system library. The display compositing process drives the touch panel to display the application interface by using a display driver (for example, an LCD/LED screen driver).

The parsed information obtained by the input system parsing the touch parameter may be a touch event such as an action down event (a pressed event), an action move event (a move event), and an action up event (a pop-up event). The focus application receives the touch event from the input system and responds to the touch event, and invokes the view system, the image drawing module, the image rendering module, and the image compositing module to generate a corresponding application image. For example, the focus application is a game APP running in the foreground. The touch event is an action move event of a target object in the game APP, and an application interface in which the target object moves to a position indicated by the action move event in the game APP may be generated.

It may be understood that for the electronic device, a higher TP sampling rate indicates a larger quantity of times of scanning and uploading the touch parameter by the touch panel driver per unit time. The larger quantity of times of scanning and uploading the touch parameter per unit time indicates a faster speed at which the electronic device responds to the received touch parameter and displays the received touch parameter, so that the time delay T is shorter. Therefore, gesture-following performance of the electronic device may be improved by increasing a TP sampling rate.

For example, a relationship between the TP sampling rate and the gesture-following performance of the electronic device is described below with reference to FIG. 2 to FIG. 4B.

Figure 2:
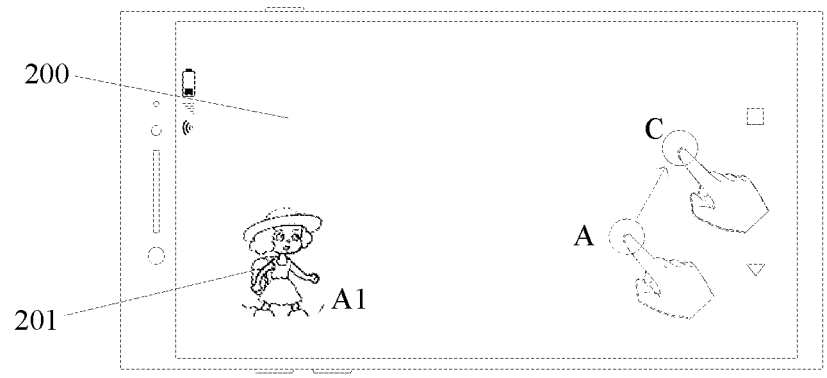
FIG. 2 is a first schematic diagram of a display surface of an electronic device according to an embodiment of this application.

FIG. 2 is a schematic diagram of a display surface of an electronic device according to an embodiment of this application. As shown in FIG. 2, the display surface 200 includes a target image 201. When a user inputs a touch operation (for example, a sliding operation) to a touch panel of an electronic device, a touch sensor of the touch panel can capture the touch operation inputted by the user. Subsequently, the touch sensor triggers a touch panel driver to scan and detect a touch parameter generated by the touch operation. The electronic device may control, according to the touch parameter generated by the touch panel driver, the target image 201 to perform a corresponding action according to the touch operation inputted by the user. For example, the electronic device may control the target image 201 to move in the display surface 200 in response to the sliding operation inputted by the user in the display surface 200. At a moment t0, an initial position of the target image 201 is A1. At the moment t0, the user may slide from a position A of the display surface 200 by using a finger to a position C of the display surface 200 at a moment t1. In the process, the electronic device may move the target image 201 from the initial position A1 to a target position corresponding to the position C, that is, C1 in FIG. 4A, in response to the sliding operation in which the finger of the user moves from the position A to the position C.

Figure 4A:
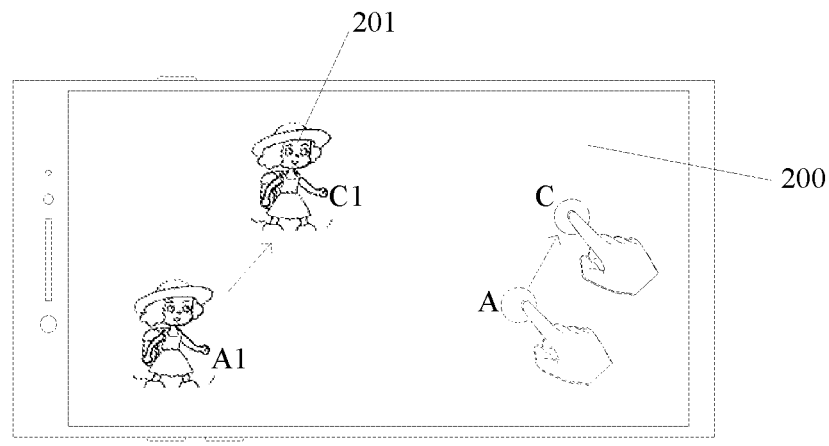
FIG. 4A is a second schematic diagram of a display surface of an electronic device according to an embodiment of this application.

For example, an example in which a time period from the moment t0 to the moment t1 is a unit time period is used to describe how the electronic device moves the target image 201 from the initial position A1 to the target position corresponding to the position C, that is, C1 in FIG. 4A, when the TP sampling rate is different.

Figure 3A:
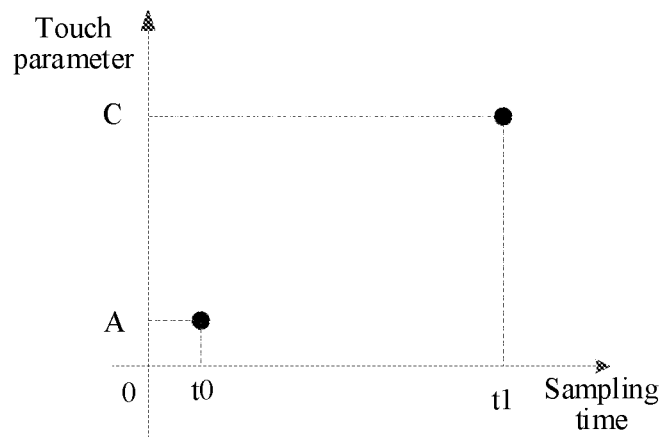
FIG. 3A is a first schematic diagram of coordinates of a sampling time and a touch parameter according to an embodiment of this application.

Example 1: when the TP sampling rate of the electronic device is 2 Hz (which is a value by way of example), it indicates that the touch panel driver needs to report two touch parameters from the moment t0 to the moment t1. For example, as shown in FIG. 3A, the touch panel driver of the electronic device may perform scanning and upload a touch parameter A at the moment t0 and the touch panel driver may perform scanning and upload a touch parameter C at the moment t1.

When the electronic device receives the touch parameter A reported by the touch panel driver for the first time, it indicates that the user touches the position A of the display position 200 by using the finger. In this case, a specific touch operation inputted by the user cannot be determined. When the electronic device receives the touch parameter C reported by the touch panel driver for the second time, it indicates that the user inputs the sliding operation of moving from the position A to the position C. In this case, as shown in FIG. 4A, the electronic device may move the target image 201 from A1 to the target position C1 corresponding to the touch parameter C in response to the sliding operation. In this case, the time delay T from "a user touches a touch panel of the electronic device by using a finger" to "an image corresponding to a touch operation displayed by the electronic device is perceived by human eyes" is a duration between the moment t0 and the moment t1.

Figure 3B:
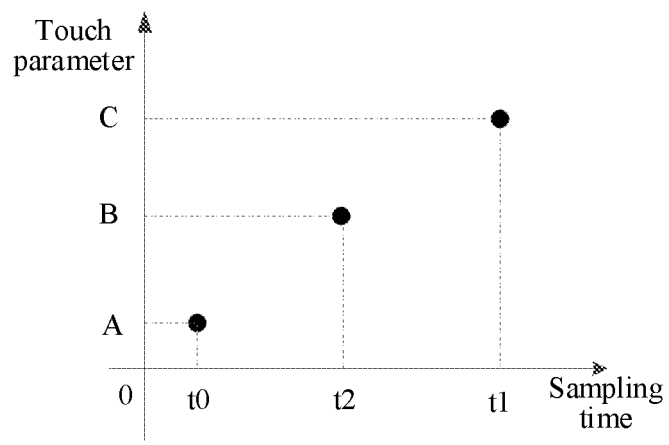
FIG. 3B is a second schematic diagram of coordinates of a sampling time and a touch parameter according to an embodiment of this application.

Example 2: when the TP sampling rate of the electronic device is 3 Hz (which is a value by way of example), it indicates that the touch panel driver needs to report three touch parameters from the moment t0 the moment t1. For example, as shown in FIG. 3B, the touch panel driver of the electronic device may perform scanning and upload the touch parameter A at the moment t0, perform scanning and upload a touch parameter B at a moment t2, and perform scanning and upload the touch parameter C at the moment t1.

When the electronic device receives the touch parameter A reported by the touch panel driver for the first time, it indicates that the user touches the position A of the display position 200 by using the finger. In this case, a specific touch operation inputted by the user cannot be determined.

Figure 4B:
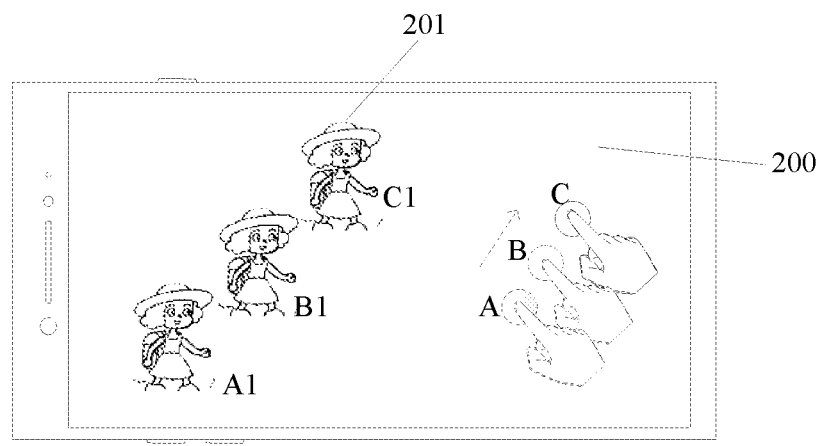
FIG. 4B is a third schematic diagram of a display surface of an electronic device according to an embodiment of this application.

When the electronic device receives the touch parameter B reported by the touch panel driver for the second time, it indicates that the user inputs a sliding operation of moving from the position A to a position B. In this case, as shown in FIG. 4B, the electronic device may move the target image 201 from A1 to a target position B1 corresponding to the touch parameter B in response to the sliding operation. In this case, the time delay T is a duration between the moment t0 and the moment t2.

When the electronic device receives the touch parameter C reported by the touch panel driver for the third time, it indicates that the user inputs a sliding operation of moving from the position B to the position C. In this case, as shown in FIG. 4B, the electronic device may move the target image 201 from B1 to the target position C1 corresponding to the touch parameter C in response to the sliding operation. In this case, the time delay T is a duration between the moment t2 and the moment t1.

It may be learned that when the TP sampling rate of the electronic device is higher, the electronic device may move the target image 201 at a faster frequency in response to the sliding operation inputted by the user, so that the time delay T is shorter. In addition, a shorter time delay T of the electronic device indicates better gesture-following performance when the user controls the electronic device by using the touch operation.

Currently, when the electronic device usually runs different applications in the foreground, the touch panel driver scans and detects the touch parameter of the touch operation by using different TP sampling rates. In this way, a TP sampling rate corresponding to an application is usually fixed. However, in different scenarios in the application or under different requirements, the user may have different requirements for the gesture-following performance. For example, a requirement of the user for gesture-following performance in a battle scenario of a game APP is higher than a requirement of the user for gesture-following performance in a non-battle scenario (for example, a scenario of logging in to a hall) of the game APP. Therefore, it is very important to adjust the TP sampling rate of the electronic device according to the scenario or requirement in the application.

For the problem, this application provides a method for adjusting a TP sampling rate, applicable to the electronic device 100.

An example in which a mobile phone is the electronic device 100 is used. A software system of the mobile phone may use a layered architecture, an event-driven architecture, a microkernel architecture, a micro service architecture, or a cloud architecture. In this embodiment of this application, the software structure of the mobile phone is illustrated by using an Android system with a layered architecture as an example.

Figure 5:
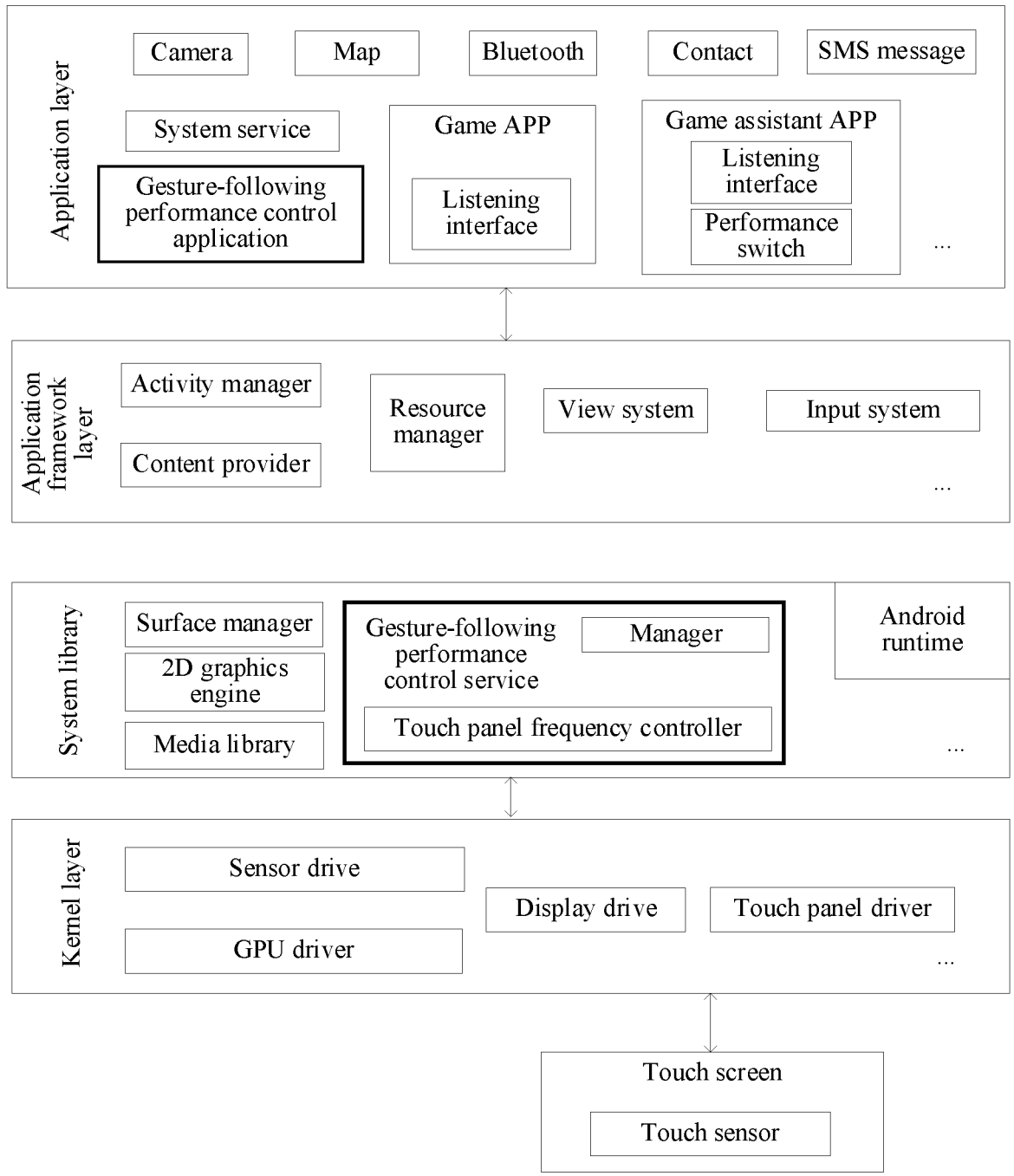
FIG. 5 is a structural block diagram of software of a mobile phone according to an embodiment of this application.

FIG. 5 is a structural block diagram of software of a mobile phone according to an embodiment of this application.

In the layered architecture, software is divided into several layers, and each layer has a clear role and task. Layers communicate with each other through a software interface. In some embodiments, the Android system is divided into four layers that are respectively an application layer, an application framework layer, an Android runtime and system library, and a kernel layer from top to bottom.

1. Application Layer

The application layer may include a series of applications and may further include a system service. The system service is a program, a routine, or a process that performs a function of a specified system, to support another program.

As shown in FIG. 5, the series of applications may include applications (applications, APPs) such as camera, map, Bluetooth, contact, and short message.

In this embodiment of this application, the application layer may further include a gesture-following performance control application, a game APP, and the like.

The gesture-following performance control application is configured to obtain an identifier of an application by using the system service. Then, the gesture-following performance control application recognizes a type of the application according to the identifier. Further, the gesture-following performance control application delivers a corresponding instruction to a gesture-following performance control service in the system library according to the type of the application, so that the gesture-following performance control service adjusts a TP sampling rate according to the instruction. For example, the identifier may be a package name of the application.

Optionally, the application layer may further include a game assistant APP. The game assistant APP includes various switches such as a performance switch and a message notification switch related to a game. The game assistant APP provides functions of various switches to applications in a preset application management list.

The performance switch is configured to improve performance of the mobile phone. The improvement of the performance of the mobile phone may refer to improving a specific parameter, to achieve an effect of improving user experience. For example, the TP sampling rate of the mobile phone is improved, and gesture-following performance of the mobile phone can be improved, to achieve the effect of improving the user experience.

In some embodiments, the electronic device may receive a first operation inputted by a user, where the first operation corresponds to a performance switch control; and obtains a status of the performance switch control in response to the first operation.

Further, before receiving the first operation inputted by the user, the electronic device may display a first interface of a first application. The electronic device receives and responds to a second operation inputted by the user and displays the performance switch control on the first interface.

Figure 6:
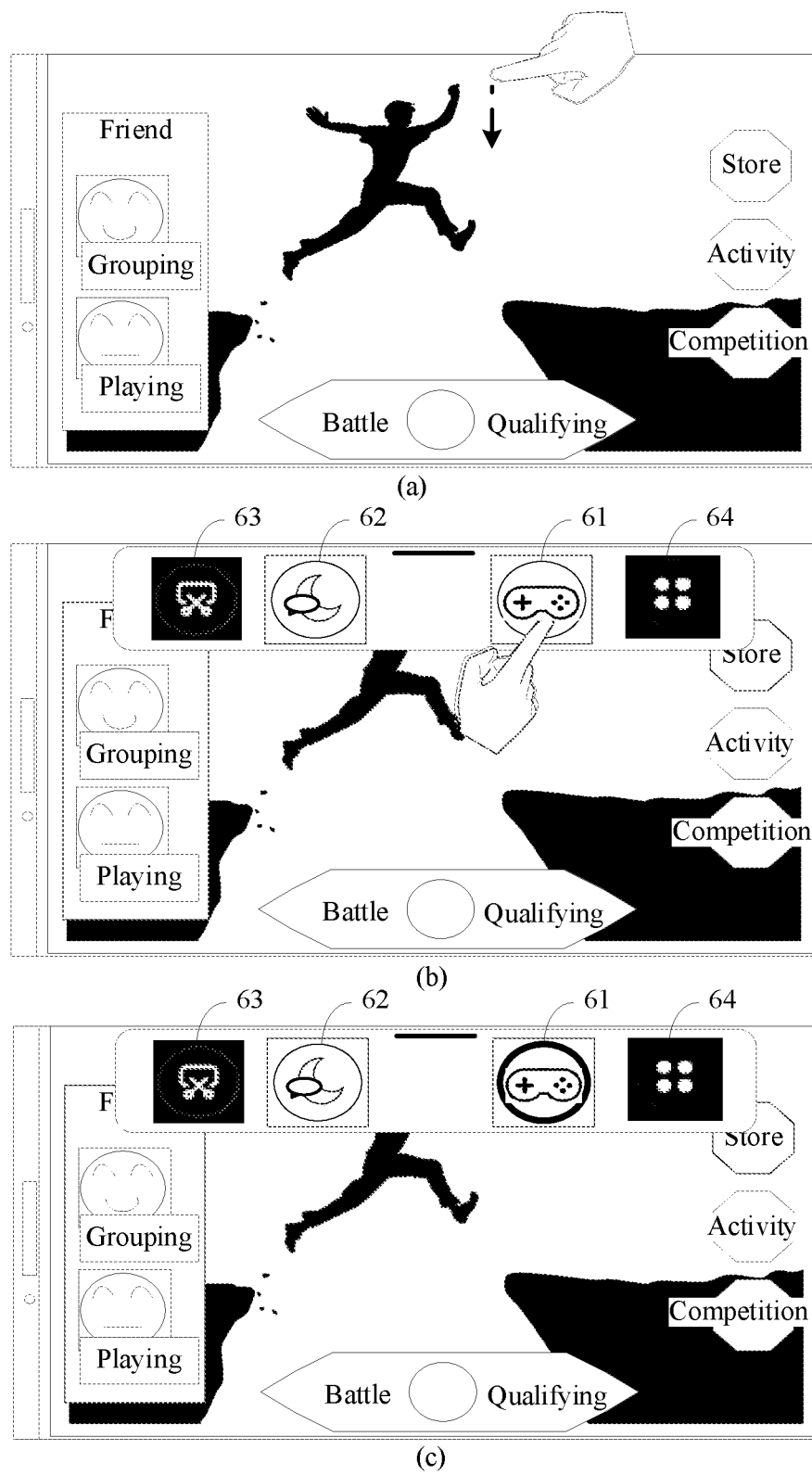
FIG. 6 is a schematic diagram of an interface in which a user adjusts a performance switch according to an embodiment of this application.

For example, any game APP in the preset application management list and the performance switch are used as examples, and the game assistant APP provides a function of the performance switch to the game APP. In a case that the mobile phone runs the game APP in a foreground, the mobile phone may receive and respond to an operation in which the user opens a main interface of the game APP, and a touch panel of the mobile phone displays the main interface (which corresponds to the first interface). The main interface is configured to provide options of a plurality of game functions. As shown in (a) of FIG. 6, the options of the plurality of game functions in the main interface may include: an option of a game mode (which including an option of a battle mode and an option of a qualifying tournament), an option of a game mall, an option of selecting a game friend, and the like.

Then, the mobile phone may receive and respond to a sliding operation (which corresponds to the second operation) in which the user sets the performance switch), and display options of a plurality of basic functions provided by the mobile phone. The sliding operation may be sliding from any side of the mobile phone to the middle of the mobile phone. As shown in (a) of FIG. 6, the sliding operation is sliding from an upper side of the mobile phone to the middle of the mobile phone. As shown in (b) of FIG. 6, the mobile phone responds to the sliding operation, and a pop-up window or a sidebar pops up on the main interface. The pop-up window or the sidebar includes the options of the plurality of basic functions such as an option 61 of setting the performance switch, an option 62 of closing a message notification, an option 63 of screen capture, an option 64 of checking more basic functions, and the like. The main interface displays a default on/off state of the performance switch (that is, the status of the performance switch control), the default on/off state of the performance switch may be off.

Then, the mobile phone may receive and respond to a click operation by the user on the option 61 of setting the performance switch (which corresponds to the first operation), and set the on/off state of the performance switch to be on. As shown in (c) of FIG. 6, after the on/off state of the performance switch is changed from off to on, a display effect of the option of the performance switch changes, that is, a line is bold.

2. Application Framework Layer

The application framework layer provides an application programming interface (application programming interface, API) and a programming framework for applications at the application layer. The application framework layer includes some predefined functions.

For example, as shown in FIG. 5, the application framework layer may include a view system (view system), a package manager (package manager), a content provider (content provider), a resource manager (resource manager), an input system (input system), and the like.

The view system is configured to construct a display surface of an application. The package manager may be configured to manage a lifecycle of each application. The application usually runs in an operating system in a form of activity. The package manager may schedule an activity process of the application to manage the lifecycle of each application. The content provider is configured to store and obtain data, so that the data can be accessed by an application. The data may include a video, an image, audio, calls made and answered, a browsing history and bookmarks, an address book, and like. The resource manager provides various resources for an application, for example, a localized character string, an icon, a picture, a layout file, and a video file. The input system is configured to listen an input module (for example, the touch panel driver) of the mobile phone, and convert a parameter inputted by the input module into a usable event and transfer the event to a related module at an upper layer. For example, the input system is configured to listen a touch panel of the mobile phone by using the touch panel driver, convert a touch parameter generated by a touch operation inputted from the touch panel into a usable event, and transfer the event to an APP at an upper layer.

3. Android Runtime (Android Runtime) and System Library

The android runtime includes a kernel library and a virtual machine. The android runtime is responsible for scheduling and management of an android system.

The kernel library includes two parts: One part is a performance function that the Java language needs to invoke, and the other part is a kernel library of Android.

The application layer and the application framework layer run on the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules. As shown in FIG. 5, the system library may include a gesture-following performance control service. The gesture-following performance control service is configured to adjust a TP sampling rate according to an application scenario and/or a user requirement.

In some embodiments, the gesture-following performance control service may include a manager and a touch panel frequency controller.

The manager is configured to obtain an application scenario of a first application running in a foreground and an on/off state of a performance switch. The touch panel frequency controller is configured to adjust the TP sampling rate according to the obtained application scenario, the on/off state of the performance switch, and a preset list (that is, the at least one list) stored in the gesture-following performance control service. The first application running in the foreground may be referred to as a current application. The preset list is used for representing requirements of some applications for the TP sampling rate.

For example, the first application is a game APP. The game APP may include a listening interface. The manager may register listening with the listening interface of the game APP, to obtain a current application scenario of the game APP. Further, in a case that the game APP runs in the foreground of the mobile phone, the game APP sends the current application scenario of the game APP (which may be referred to as a current application scenario) to the manager through the listening interface of the game APP when the application scenario changes. The current application scenario may refer to the second application scenario.

Similarly, the game assistant APP may also include a listening interface. The manager may register listening with the listening interface of the game assistant APP, to obtain the on/off state of the performance switch in the game assistant APP. Further, when the on/off state of the performance switch changes, the game assistant APP sends a current on/off state of the performance switch to the manager through the listening interface of the game assistant APP.

The listening interface of the game APP may be the same as or different from the listening interface of the game assistant APP.

In a case that the game APP is installed on the mobile phone, the manager may register listening with the listening interface of the game APP when the mobile phone is powered on. Alternatively, in a case that the game APP is installed on the mobile phone, the manager may register listening with the listening interface of the game APP when the mobile phone starts the game APP. Alternatively, when the game APP is downloaded and installed on the mobile phone, the manager may register listening with the listening interface of the game APP. A moment at which the manager registers listening with the listening interface of the game APP is not limited in this embodiment of this application.

In a case that the game assistant APP is installed on the mobile phone, the manager may register listening with the listening interface of the game assistant APP when the mobile phone is powered on. Alternatively, in a case that the game assistant APP is installed on the mobile phone, the manager may register listening with the listening interface of the game assistant APP when the mobile phone starts any game APP. Alternatively, when the game assistant APP is downloaded and installed on the mobile phone, the manager may register listening with the listening interface of the game assistant APP. A moment at which the manager registers listening with the listening interface of the game assistant APP is not limited in this embodiment of this application.

The listening interface of the game APP (or the listening interface of the game assistant APP) may be a software development kit (software development kit, SDK) interface or an application programming interface (application programming interface, API). When both the listening interface of the game APP and the listening interface of the game assistant APP are the SDK interfaces, the manager may also be referred to as an SDK manager.

In some embodiments, the application scenario may be divided into a game scenario and a non-game scenario. The application scenario of the game APP is the game scenario. An application scenario of another APP of a non-game type is the non-game scenario.

The game scenario may include a battle scenario and a non-battle scenario. The battle scenario may refer to a scenario in which the game APP is in a game process, that is, a scenario in which the user is playing the game. The battle scenario may include at least one sub-scenario in which the game APP is in a game process, for example, escaping and killing monsters. The non-battle scenario refers to another game scenario other than the battle scenario, for example, loading, logging, and a game lobby. The change of the game scenario may refer to a change between the battle scenario and the non-battle scenario, or may refer to a change between any two sub-scenarios in the battle scenario.

As shown in FIG. 5, the system library may include a surface manager (surface manager), a media library (Media Libraries), and a 2D graphics engine (for example, SGL), and the like.

The surface manager is configured to manage a display subsystem, and converge 2D and 3D layers of a plurality of applications. The media library supports playback and recording of a plurality of common audio and video formats, a static image file, and the like. The media library may support a plurality of audio and video encoding formats, for example, MPEG 4, H.264, MP3, AAC, AMR, JPG, and PNG. The 2D graphics engine is a drawing engine for 2D drawings.

4. Kernel Layer

The kernel layer is a layer between hardware and software. The kernel layer includes at least a touch panel driver (TP driver), a display driver (for example, an LCD/LED screen driver), a graphics processing unit (graphics processing unit, GPU) driver, a sensor driver, or the like. This is not limited in this embodiment of this application.

The mobile phone shown in FIG. 5 is used as an example, and the method for adjusting a TP sampling rate provided in this embodiment of this application is described in detail with reference to the accompanying drawings.

In some embodiments, the electronic device may adjust the TP sampling rate in response to an operation inputted by the user on the on/off state of the performance switch in a case that any application runs in the foreground. Specifically, the electronic device may receive a first operation inputted by a user, where the first operation corresponds to a performance switch control; and then obtain a status of the performance switch control in response to the first operation. The electronic device determines a TP sampling rate as a first sampling rate in a case that the status of the performance switch control changes, where the first sampling rate is different from a sampling rate obtained for the TP sampling rate before the first operation is received. Finally, the electronic device scans a touch operation on a TP based on the first sampling rate.

In some embodiments, the electronic device may adjust, in a case that a first application runs in a foreground, the TP sampling rate according to an identifier of the first application and the on/off state of the performance switch in response to the operation inputted by the user on the on/off state of the performance switch. Specifically, the electronic device may receive and respond to an operation of starting the first application by the user (for example, a click operation on an icon of the first application) to start the first application. When the first application is started, the electronic device may obtain an identifier of the first application. Then, the electronic device may receive the first operation inputted by the user, where the first operation corresponds to the performance switch control, and obtain the status of the performance switch control in response to the first operation. Then, the electronic device determines the TP sampling rate as the first sampling rate according to the identifier of the first application in a case that the status of the performance switch control changes. Finally, the electronic device scans the touch operation on a TP based on the first sampling rate.

Figure 7:
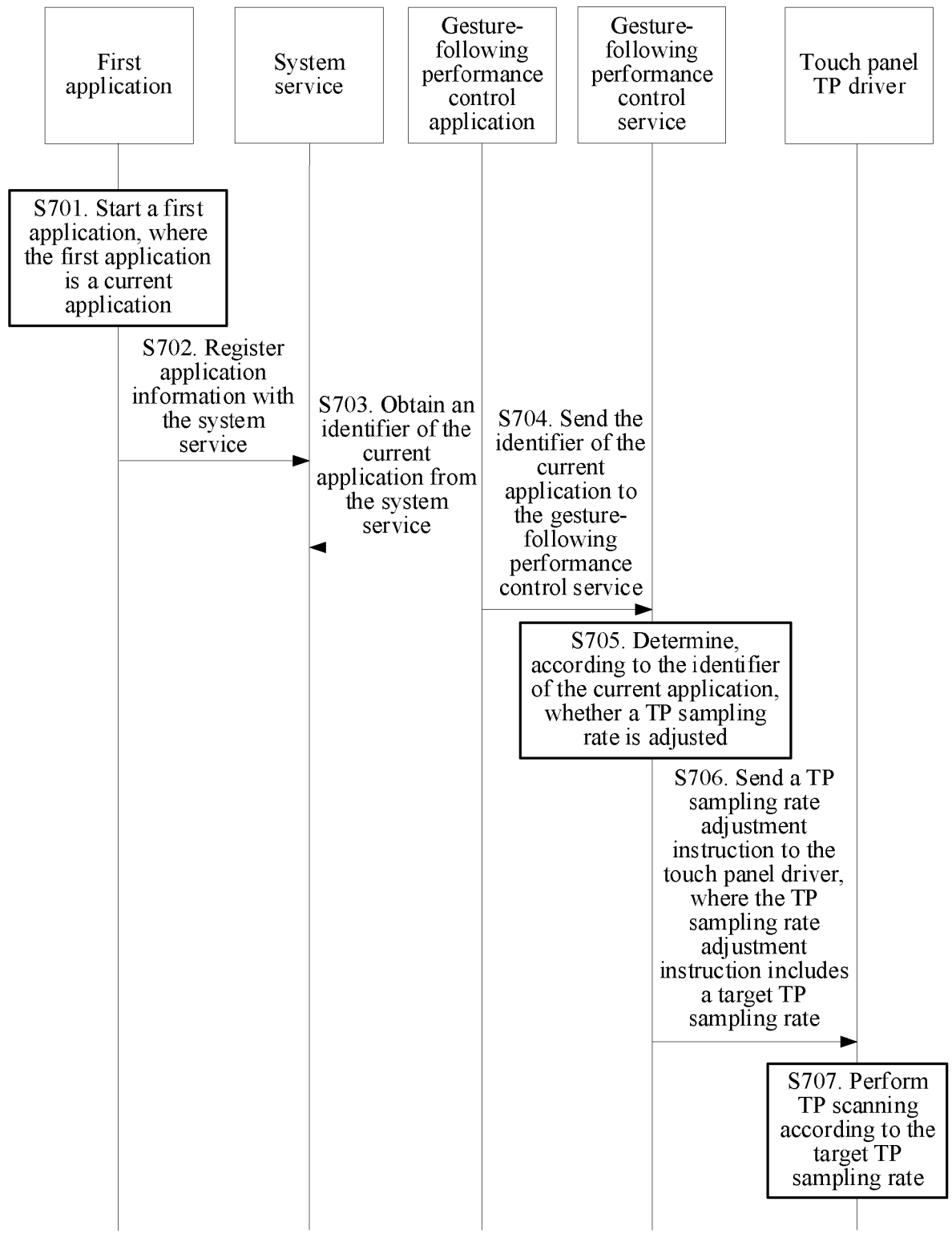
FIG. 7 is a first flowchart of a method for adjusting a sampling rate of a TP according to an embodiment of this application.

Referring to FIG. 7, a method for adjusting a sampling rate of a TP provided in this embodiment of this application may include S701 to S707.

S701. Start a first application. The first application is a current application.

An example in which the first application is a game APP is used. A mobile phone receives an operation of starting the game APP by a user on a touch panel, for example, a click operation on an icon of the game APP on a desktop of the mobile phone. Subsequently, the mobile phone starts and runs the game APP in a foreground in response to the operation of starting the game APP.

S702. The current application registers application information with a system service.

When the current application starts running in an application layer, application information of the current application needs to be registered in the system service. The application information may include an identifier of the current application (for example, a package name of the current application).

S703. A gesture-following performance control application obtains the identifier of the current application from the system service.

The gesture-following performance control application is configured to monitor starting of the application and obtain the identifier of the current application from the system service after the application is started. In this way, after the current application is started, the gesture-following performance control application may monitor starting of the current application; and then obtain the identifier of the current application from the system service.

S704. The gesture-following performance control application sends the identifier of the current application to a gesture-following performance control service.

For example, the gesture-following performance control application may send an identifier of the game APP to a gesture-following performance control service through an information exchange interface provided by the gesture-following performance control service to the outside. The information exchange interface supports information exchange between the gesture-following performance control service and another module.

S705. The gesture-following performance control service determines, according to the identifier of the current application, whether a TP sampling rate is adjusted.

Further, if the gesture-following performance control service determines that the TP sampling rate needs to be adjusted, S706 is performed. If the gesture-following performance control service determines that the TP sampling rate does not need to be adjusted, the process ends. The gesture-following performance control service not only determines that the TP sampling rate needs to be adjusted, but also determines a target TP sampling rate to which the TP sampling rate needs to be adjusted. The target TP sampling rate refers to a value (for example, the first sampling rate or the second sampling rate) obtained after the TP sampling rate is adjusted.

In some embodiments, after receiving the identifier of the current application, the gesture-following performance control service first determines whether the mobile phone supports adjustment of the TP sampling rate. First, it may be determined whether the mobile phone supports adjustment of the TP sampling rate. Subsequently, in a case that the mobile phone supports adjustment of the TP sampling rate, the gesture-following performance control service may determine, according to the identifier of the current application, whether the current application has a relatively high requirement for gesture-following performance. If the current application has the relatively high requirement for the gesture-following performance, the TP sampling rate may be adjusted, for example, the TP sampling rate is increased. If the current application does not have the relatively high requirement for the gesture-following performance, it may be determined whether a previous application (that is, the second application) running in the foreground before the current application has a relatively high requirement for the gesture-following performance. If the previous application has the relatively high requirement for the gesture-following performance, it indicates that the TP sampling rate may be increased before the current application. To reduce power consumption, the TP sampling rate may be reduced.

For example, when adjusting the TP sampling rate in a case that the current application has the relatively high requirement for the gesture-following performance, the gesture-following performance control service may further record the adjusted TP sampling rate.

The gesture-following performance control service may obtain a configuration parameter of the mobile phone and determine, according to the configuration parameter, whether the mobile phone supports adjustment of the TP sampling rate. For example, the configuration parameter may include a range of the TP sampling rates supported by the mobile phone, a model of the mobile phone, a size of the mobile phone, and an on/off state of a firmware enable switch.

Whether the mobile phone supports adjustment of the TP sampling rate may be referred to as whether firmware of the mobile phone is enabled. When the firmware of the mobile phone is enabled, the mobile phone can support adjustment of the TP sampling rate. Therefore, the gesture-following performance control service may determine, according to the on/off state of the firmware enable switch of the mobile phone, whether the mobile phone supports adjustment of the TP sampling rate. For example, when the firmware enable switch is on, it is determined that the mobile phone supports adjustment of the TP sampling rate. When the firmware enable switch is off, it is determined that the mobile phone does not support adjustment of the TP sampling rate.

It should be noted that in this embodiment of this application, a specific process of adjusting the TP sampling rate is described below by using an example in which whether the mobile phone supports adjustment of the TP sampling rate is determined according to the on/off state of the firmware enable switch.

In some embodiments, considering that an application belonging to a target application type (for example, a game type) has a relatively high requirement for the gesture-following performance of the electronic device, the gesture-following performance control service may determine, according to the identifier of the current application, whether a type of the current application is the target application type. If the type of the current application is the target application type, the gesture-following performance control service may determine how to adjust the TP sampling rate. If it is determined that the TP sampling rate is adjusted, the adjusted TP sampling rate may be recorded and stored. Subsequently, because some application scenarios of the current application have relatively high requirements for the gesture-following performance of the electronic device, the gesture-following performance control service may further obtain an application scenario of the current application and determine, according to the obtained application scenario, how to adjust the TP sampling rate.

For example, the target application type having the relatively high requirement for the gesture-following performance is the game type. When determining, according to the identifier of the current application, that the type of the current application is the game type, a touch panel frequency controller in the gesture-following performance control service determines, according to the identifier of the current application and a preset list, how to adjust the TP sampling rate. Subsequently, when the application scenario changes, the current application sends a current application scenario to a manager in the gesture-following performance control service through a listening interface of the current application. When an on/off state of a performance switch changes, a game assistant APP sends a current on/off state of the performance switch to the manager through a listening interface of the game assistant APP.

Subsequently, after obtaining the current application scenario, the manager determines a type identifier corresponding to the current application scenario and stores the type identifier. The type identifier represents an application scenario type to which the current application scenario belongs (for example, a battle scenario or a non-battle scenario to which a game scenario belongs). After obtaining the current on/off state of the performance switch, the manager stores the current on/off state of the performance switch. Further, after determining the type identifier corresponding to the current application scenario, the manager compares the type identifier with a type identifier corresponding to a previously stored application scenario (that is, the first application scenario) and determines whether the application scenario type changes. After obtaining the current on/off state of the performance switch, the manager compares the current on/off state with a previously stored on/off state of the performance switch and determines whether the on/off state of the performance switch changes.

After determining that the application scenario type changes or the on/off state of the performance switch changes, the manager sends a TP sampling rate adjustment instruction to the touch panel frequency controller. The TP sampling rate adjustment instruction may include the identifier of the current application, the type identifier corresponding to the current application scenario, and the current on/off state of the performance switch. After receiving the TP sampling rate adjustment instruction, the touch panel frequency controller may determine, according to the type identifier corresponding to the current application scenario, the current on/off state of the performance switch, and the preset list stored in the gesture-following performance control service, whether a relatively large TP sampling rate needs to be delivered to a touch panel driver.

In some embodiments, the following three specific implementations in which the manager obtains the application scenario of the current application or the on/off state of the performance switch and determines whether the application scenario type changes may be included:

In one implementation, during running in the foreground, when determining that the application scenario changes, the current application may send a scenario change instruction to the manager through the listening interface. The manager obtains the scenario change instruction. The scenario change instruction may include an application scenario after change and an application scenario before change. The scenario change instruction is used for indicating that the application scenario of the current application changes. The application scenario after the change is a current application scenario. Subsequently, the manager may determine a type identifier corresponding to the current application scenario, compare the type identifier with a type identifier corresponding to a previous application scenario, and determine whether the application scenario type changes.

In another implementation, during running in the foreground, the current application may send a scenario instruction to the manager through the listening interface according to a fixed time period. The manager obtains the scenario instruction. The scenario instruction may include a current application scenario. Subsequently, the manager may determine a type identifier corresponding to the current application scenario, compare the type identifier with a type identifier corresponding to a previous application scenario, and determine whether the application scenario type changes.

In still another implementation, when the current application runs in the foreground, when determining the on/off state of the performance switch changes, the game assistant APP may send an on/off change instruction to the manager through the listening interface. The on/off change instruction may include an on/off state of the performance switch after change and an on/off state of the performance switch before change. The on/off change instruction is used for indicating that the on/off state of the performance switch changes. After receiving the on/off change instruction, the manager may determine that the on/off state of the performance switch changes. The on/off state of the performance switch after the change is a current on/off state of the performance switch.

In some embodiments, the preset list may include at least one of the following: a target application type list, a blacklist (that is, the first list), a whitelist (that is, the fourth list), a filtering list (that is, the fifth list), a TP high report list (that is, the second list), a performance switch maintenance list (that is, the third list), or the like.

The target application type list may include identifiers of a plurality of game applications having relatively high requirements for the gesture-following performance. The blacklist may include an identifier of an application having a relatively low requirement for the gesture-following performance. The whitelist may include an identifier of an application having a relatively high requirement for the gesture-following performance. The filtering list may include an identifier of an application that does not support a highest TP sampling rate. The TP high report list may include an identifier of an application that supports a relatively high TP sampling rate. The performance switch maintenance list may include an identifier of an application that supports the user to adjust the TP sampling rate by using the performance switch.

It should be noted that the lists are examples, and specific content of the lists is not limited in this embodiment of this application. For example, the whitelist may include identifiers of a plurality of applications that occupy a system memory greater than a first memory threshold when being in a running state. The filtering list may also include an identifier of an application that supports a highest TP sampling rate.

S706. The gesture-following performance control service sends a TP sampling rate adjustment instruction to a touch panel driver, where the TP sampling rate adjustment instruction includes a target TP sampling rate.

Specifically, the touch panel frequency controller in the gesture-following performance control service sends the TP sampling rate adjustment instruction to the touch panel driver. In addition, the gesture-following performance control service may store the target TP sampling rate.

S707. The touch panel driver receives and responds to the TP sampling rate adjustment instruction and performs TP scanning according to the target TP sampling rate.

Specifically, the touch panel driver may scan a touch operation by the user on the TP according to the target TP sampling rate in the TP sampling rate adjustment instruction and report a corresponding touch parameter to an input system. The input system parses the touch parameter and sends parsed information to a game APP. The game APP receives and responds to the parsed information, invokes a view system, an image drawing module, an image rendering module, and an image compositing module to generate a corresponding application image, and notifies a display driver to drive the TP to display the application image.

It may be understood that when determining that the application scenario type changes or the on/off state of the performance switch changes, the electronic device may adjust the TP sampling rate, that is, the electronic device can adjust the TP sampling rate according to the application scenario and the on/off state of the performance switch. In addition, the on/off state of the performance switch may be controlled by the user. Therefore, the user can indirectly adjust the TP sampling rate, to improve the user experience.

In some embodiments, the gesture-following performance control service may set a mode 1 using a first TP sampling rate (that is, the third sampling rate) and a mode 2 using a second TP sampling rate (that is, the fourth sampling rate). The first TP sampling rate may be a highest TP sampling rate supported by the electronic device. The second TP sampling rate may be a sampling rate less than the TP sampling rate corresponding to the mode 1 and greater than or equal to a default TP sampling rate of the electronic device.

Subsequently, after the gesture-following performance control service adjusts the touch panel driver to the first TP sampling rate corresponding to the mode 1 or the second TP sampling rate corresponding to the mode 2, if the first application running in the foreground changes, a requirement of the changed current application for the gesture-following performance is reduced. To avoid unnecessary power consumption, the gesture-following performance control service may control the touch panel driver to exit the mode 1 or the mode 2. That the gesture-following performance control service controls the touch panel driver to exit the mode 1 refers to that the touch panel driver is adjusted from the first TP sampling rate corresponding to the mode 1 to a third TP sampling rate (that is, the sixth sampling rate). That the gesture-following performance control service controls the touch panel driver to exit the mode 2 refers to that the touch panel driver is adjusted from the second TP sampling rate corresponding to the mode 2 to a fourth TP sampling rate.

When adjusting the touch panel driver to the mode 1 or the model 2, the gesture-following performance control service may store the adjust mode 1 or mode 2. Then, if the requirement of the changed current application for the gesture-following performance is reduced, it may be determined, according to the stored mode 1 or mode 2, whether the touch panel driver exits the mode 1 (that is, the touch panel driver is adjusted from the first TP sampling rate corresponding to the mode 1 to the third TP sampling rate) or exits the mode 2 (that is, the touch panel driver is adjusted from the second TP sampling rate corresponding to the mode 2 to the fourth TP sampling rate).

The first TP sampling rate is greater than the second TP sampling rate, the third TP sampling rate (that is, the sixth sampling rate), and the fourth TP sampling rate (that is, the seventh sampling rate). The second TP sampling rate, the third TP sampling rate, and the fourth TP sampling rate are all greater than or equal to a default TP sampling rate of the touch panel of the mobile phone. A magnitude relationship among the second TP sampling rate, the third TP sampling rate, and the fourth TP sampling rate is not limited.

Referring to FIG. 8, a process in which the gesture-following performance control service determines how to adjust the TP sampling rate according to the identifier of the current application and the preset list in S705 is described by using an example in which the TP sampling rate is adjusted for the game application, which may include S801 to S815.

S801. Determine whether an on/off state of a firmware enable switch is on.

Specifically, the gesture-following performance control service may obtain the on/off state of the firmware enable switch from a configuration file of the mobile phone. The on/off state of the firmware enable switch may be preset at delivery of the mobile phone. Then, in a case that the on/off state of the firmware enable switch is on, it is determined that the mobile phone supports adjustment of the TP sampling rate, and S802 is performed. In a case that the on/off state of the firmware enabling switch is off, it is determined that the mobile phone does not support adjustment of the TP sampling rate, and the TP sampling rate is not adjusted, that is, S815 is performed.

The gesture-following performance control service may obtain the on/off state of the firmware enable switch during startup of the mobile phone; or obtain the on/off state of the firmware enable switch at any moment before S801. In this embodiment of this application, a moment of obtaining the on/off state of the firmware enable switch is not limited.

S802. Determine whether a current application scenario is a game scenario.

The gesture-following performance control service performs S803 when the current application scenario is the game scenario; and performs S808 when the current application scenario is a non-game scenario.

For example, the gesture-following performance control service may determine whether an identifier of a current application belongs to the target application type list. The target application type list may include identifiers of a plurality of game applications having relatively high requirements for the gesture-following performance. In a case that the identifier of the current application belongs to the target application type list, it is determined that the current application is a game application, and the current application scenario is a game scenario. In a case that the identifier of the current application does not belong to the target application type list, it is determined that the current application is a non-game application, and the current application scenario is a non-game scenario.

S803. Determine whether an identifier of a current application is in a blacklist.

The blacklist may include an identifier of an application having a relatively low requirement for the gesture-following performance. If the identifier of the current application is in the blacklist, it indicates that a requirement of the current application for the gesture-following performance is relatively low, and S804 may be performed. If the identifier of the current application is not in the blacklist, it may continue to determine whether the identifier of the current application is in a whitelist, that is, S805 is performed.

S804. Determine a TP broad enable switch is on.

Specifically, the gesture-following performance control service may obtain an on/off state of a TP broad enable switch from the configuration file of the mobile phone. The TP broad enable switch is a switch for managing whether a game special effect is opened. The game special effect may include a game display effect set for the game APP, for example, a specific contrast or a specific color rendering index.

The gesture-following performance control service may obtain the on/off state of the TP broad enable switch during startup of the mobile phone; or obtain the on/off state of the TP broad enable switch at any moment before S804. In this embodiment of this application, a moment of obtaining the on/off state of the TP broad enable switch is not limited.

Specifically, in a case that the TP broad enable switch is on, the gesture-following performance control service determines that the TP sampling rate is adjusted, that is, S814 is performed, and determines that the mode 2 is entered. In a case that the TP broad enable switch is off, it is determined that the TP sampling rate is not adjusted, that is, S815 is performed.

When determining that the mode 2 is entered, the gesture-following performance control service sends a TP sampling rate adjustment instruction to the touch panel driver. A target TP sampling rate in the TP sampling rate adjustment instruction is the second TP sampling rate adopted in the mode 2.

For example, when a maximum TP sampling rate supported by the electronic device is 360 Hz (Hz), and a minimum TP sampling rate is 100 Hz, the second TP sampling rate may be 180 Hz.

It should be noted that in a case that the TP sampling rate is adjusted for the game APP, the gesture-following performance control service performs the process of S804. In a case that the TP sampling rate is adjusted for another application of a non-game type, S804 may not be performed.

S805. Determine whether the identifier of the current application is in a whitelist.

The whitelist may include an identifier of an application having a relatively high requirement for the gesture-following performance. If the identifier of the current application is in the whitelist, it indicates that the requirement of the current application for the gesture-following performance is relatively high, and it may continue to determine whether the identifier of the current application is in a filtering list, that is, S806 is performed. If the identifier of the current application is not in the whitelist, S804 may be performed.

S806. Determine whether the identifier of the current application is in a filtering list.

The filtering list may include an identifier of an application that does not support the highest TP sampling rate (for example, the first TP sampling rate). If the identifier of the current application is in the filtering list, it indicates that the current application does not support the first TP sampling rate, it may be determined that the TP sampling rate is adjusted, that is, S814 is performed, and it is determined that the mode 2 is entered. If the identifier of the current application is not in the filtering list, it may continue to determine whether the identifier of the current application is in a TP high report list, that is, S807 is performed.

For example, when the maximum TP sampling rate supported by the electronic device is 360 Hz (Hz), and the minimum TP sampling rate is 100 Hz, the first TP sampling rate may be 360 Hz.

S807. Determine whether the identifier of the current application is in a TP high report list.

The TP high report list may include an identifier of an application that supports a relatively high TP sampling rate. If the identifier of the current application is in the TP high report list, it indicates that the current application supports the relatively high TP sampling rate, it may be determined that the TP sampling rate is adjusted, that is, S814 is performed, and it is determined that the mode 1 is entered. If the identifier of the current application is not in the TP high report list, it indicates that the current application does not support the relatively high TP sampling rate, it may be determined that the TP sampling rate is adjusted, that is, S814 is performed, and it is determined that the mode 2 is entered.

For example, the TP high report list may be a subset of the target application type list. For example, the target application type list includes a network game APP and a stand-alone game APP. The TP high report list includes the network game APP, but does not include the stand-alone game APP.

S808. Determine whether an application scenario of a previous application is the game scenario.

When determining that the first TP sampling rate of the mode 1 or the second TP sampling rate of the mode 2 does not need to be adjusted for the current application, the gesture-following performance control service may determine whether the first TP sampling rate of the mode 1 or the second TP sampling rate of the mode 2 is set for a previous application. If the first TP sampling rate or the second TP sampling rate has been set for the previous application, in order to avoid unnecessary power consumption, the gesture-following performance control service may control the touch panel driver to exit the mode 1 or mode 2. In a case that the application scenario of the previous application is the game scenario, S809 is performed. In a case that the application scenario of the previous application is not the game scenario, the TP sampling rate is not adjusted, that is, S815 is performed.

The previous application is an application running before the current application, may be any application, or may be an operating system of the electronic device.

It should be noted that for a specific process in which the gesture-following performance control service determines whether the application scenario of the previous application is the game scenario, reference may be made to the detailed description that the gesture-following performance control service determines whether the application scenario of the current application is the game scenario, and details are not described herein in this embodiment of this application.

S809. Determine whether an identifier of the previous application is in the blacklist.

If the identifier of the previous application is in the blacklist, S810 may be performed. If the identifier of the previous application is not in the blacklist, it may continue to determine whether the identifier of the previous application is in the whitelist, that is, S811 is performed.

S810. Determine the TP broad enable switch is on.

In a case that the TP broad enable switch is on, the gesture-following performance control service determines that the TP sampling rate is adjusted, that is, S814 is performed, and determines that the mode 2 is exited. In a case that the TP broad enable switch is off, it is determined that the TP sampling rate is not adjusted, that is, S815 is performed.

When determining that the mode 2 is exited, the gesture-following performance control service sends a TP sampling rate adjustment instruction to the touch panel driver. A target TP sampling rate in the TP sampling rate adjustment instruction is the fourth TP sampling rate.

For example, when the maximum TP sampling rate supported by the electronic device is 360 Hz (Hz), and the minimum TP sampling rate is 100 Hz, the fourth TP sampling rate may be 100 Hz.

S811. Determine whether the identifier of the previous application is in the whitelist.

If the identifier of the previous application is in the whitelist, it may continue to determine whether the identifier of the previous application is in the filtering list, that is, S812 is performed. If the identifier of the previous application is not in the whitelist, S810 may be performed.

S812. Determine whether the identifier of the previous application is in the filtering list.

If the identifier of the previous application is in the filtering list, it may be determined that the TP sampling rate is adjusted, that is, S814 is performed, and it is determined that the mode 2 is exited. If the identifier of the previous application is not in the filtering list, S813 may be performed.

S813. Determine whether the identifier of the previous application is in the TP high report list.

If the identifier of the previous application is in the TP high report list, it may be determined that the TP sampling rate is adjusted, that is, S814 is performed, and it is determined that the mode 1 is exited. If the identifier of the previous application is not in the TP high report list, it may be determined that the TP sampling rate is adjusted, that is, S814 is performed, and it is determined that the mode 2 is entered.

When determining that the mode 1 is exited, the gesture-following performance control service sends a TP sampling rate adjustment instruction to the touch panel driver. A target TP sampling rate in the TP sampling rate adjustment instruction is the third TP sampling rate.

For example, when the maximum TP sampling rate supported by the electronic device is 360 Hz (Hz), and the minimum TP sampling rate is 100 Hz, the third TP sampling rate may be 300 Hz.

S814. Determine that the TP sampling rate is adjusted.

When determining that the TP sampling rate is adjusted, the gesture-following performance control service specifically determines that the touch panel driver is adjusted to enter the mode 1, enter the mode 2, exit the mode 1, or exit the mode 2, and records and stores the adjusted entered mode 1, entered mode 2, exited mode 1, or exited mode 2.

S815. Determine that the TP sampling rate is not adjusted.

The gesture-following performance control service determines that the TP sampling rate does not need to be adjusted for the current application.

It may be understood that except the determined object of S809 to S813 is the previous application and the determined object of S803 to S807 is the current application, S809 to S813 is substantially the same as S803 to S807. Therefore, it may be learned that if it is determined, by performing S803 to S807 on the current application, that the mode 1 is entered (or the mode 2 is entered), the current application is closed, a new current application runs in the foreground, and the current application becomes a previous application. Then, it may be determined, by performing S809 to S813 on the previous application, that the mode 1 is exited (or the mode 2 is exited). Therefore, after determining that the application scenario of the previous application is the game scenario, the gesture-following performance control service may not perform S809 to S813 but determine, according to the mode 1 (or the mode 2) corresponding to the previous application, that the mode 1 is exited (or the mode 2 is exited).

Figure 9A:
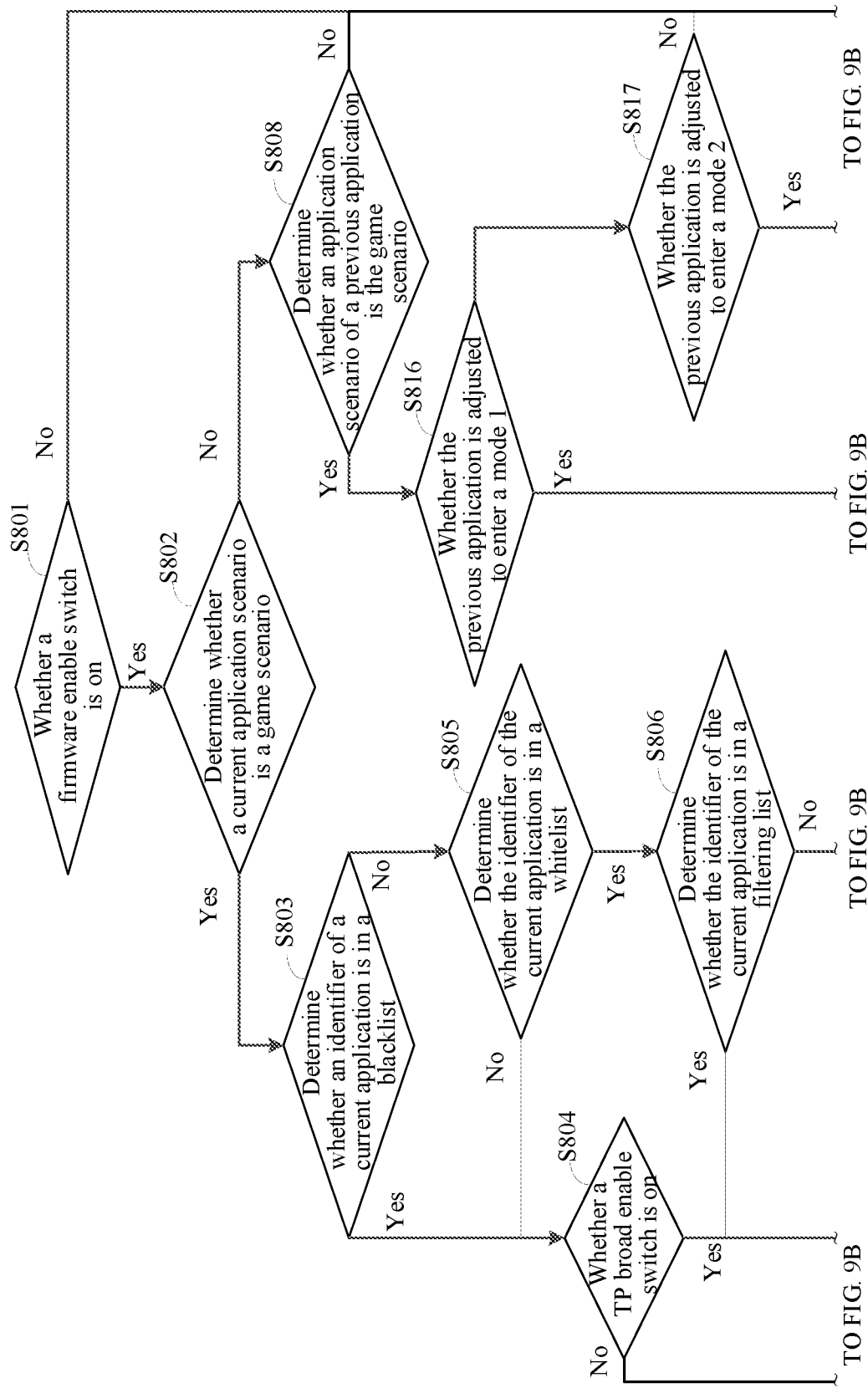
FIG. 9A and FIG. 9B are a third flowchart of a method for adjusting a sampling rate of a TP according to an embodiment of this application.
Figure 9B:
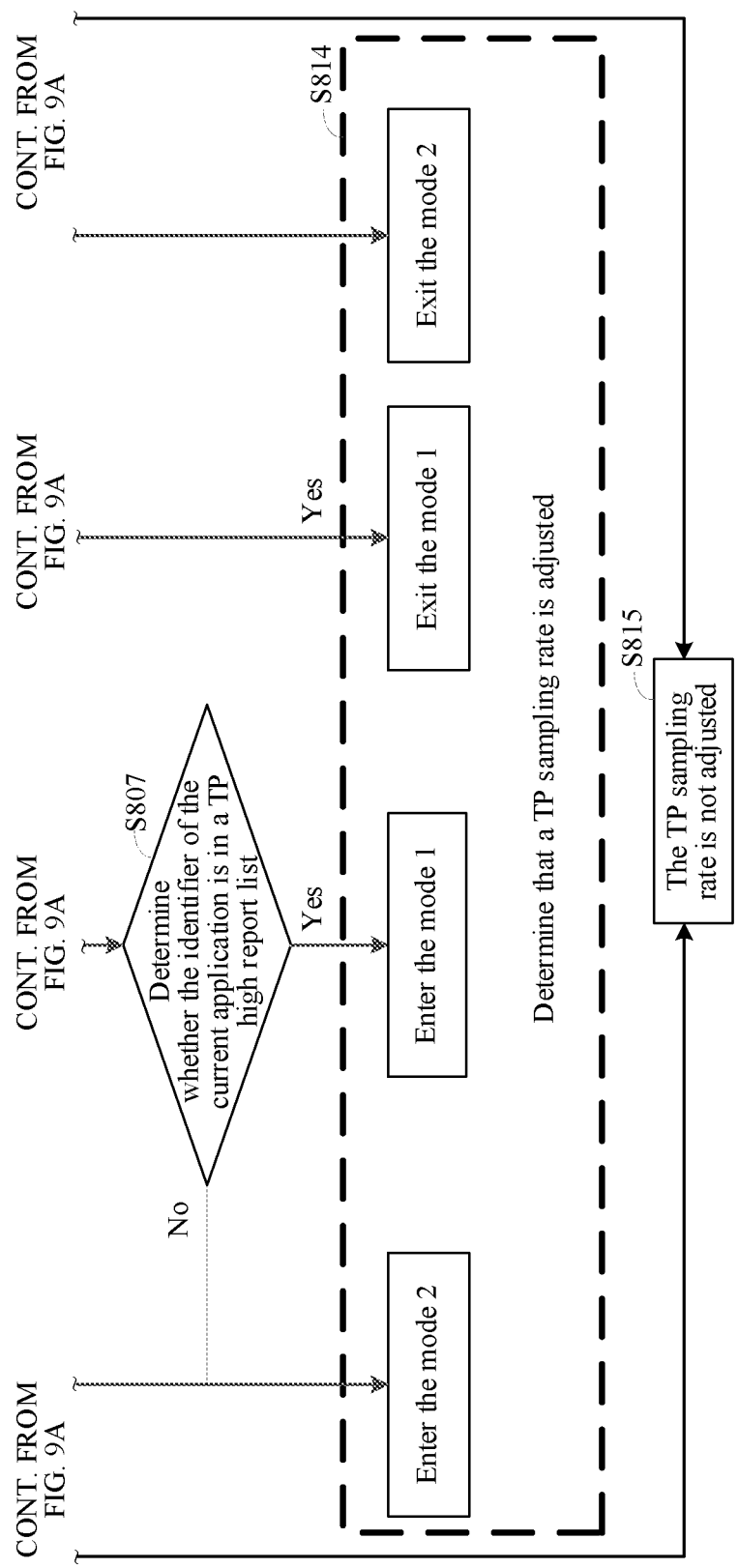

For example, as shown in FIG. 9A and FIG. 9B, after S808, the method for adjusting a TP sampling rate may not include S809 to S813 but include S816 and S817.

S816. Determine whether the previous application is adjusted to a mode 1.

When determining that the TP sampling rate is adjusted for the previous application, the gesture-following performance control service records and stores the adjusted entered mode 1, entered mode 2, exited mode 1, or exited mode 2. Therefore, the gesture-following performance control service may directly obtain the entered mode 1, the entered mode 2, the exited mode 1, or the exited mode 2 to which the previous application is adjusted. In a case that the previous application is adjusted to enter the mode 1, S814 is performed, and it is determined that the mode 1 is exited. In a case that the previous application is not adjusted to enter the mode 1, S817 is performed.

S817. Determine whether the previous application is adjusted to a mode 2.

Specifically, the gesture-following performance control service determines, according to the stored entered mode 1, entered mode 2, exited mode 1, or exited mode 2 to which the previous application is adjusted, whether the previous application is adjusted to the mode 2. In a case that the previous application is adjusted to enter the mode 2, S814 is performed, and it is determined that the mode 2 is exited. In a case that the previous application is adjusted to not enter the mode 2, S815 is performed.

It should be noted that the gesture-following performance control service may first perform S817 and then perform S816.

Figure 8A:
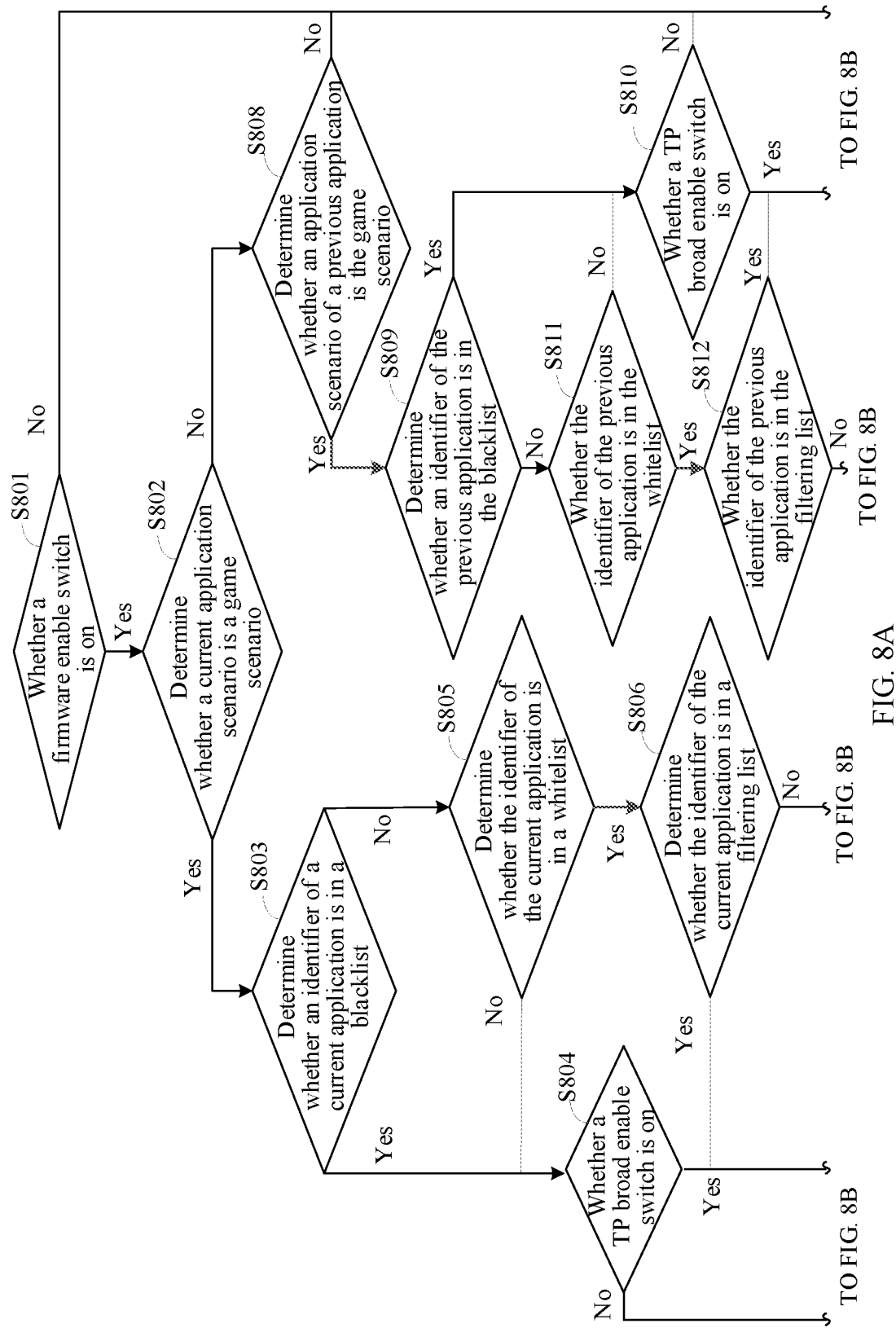
FIG. 8A and FIG. 8B are a second flowchart of a method for adjusting a sampling rate of a TP according to an embodiment of this application.
Figure 8B:
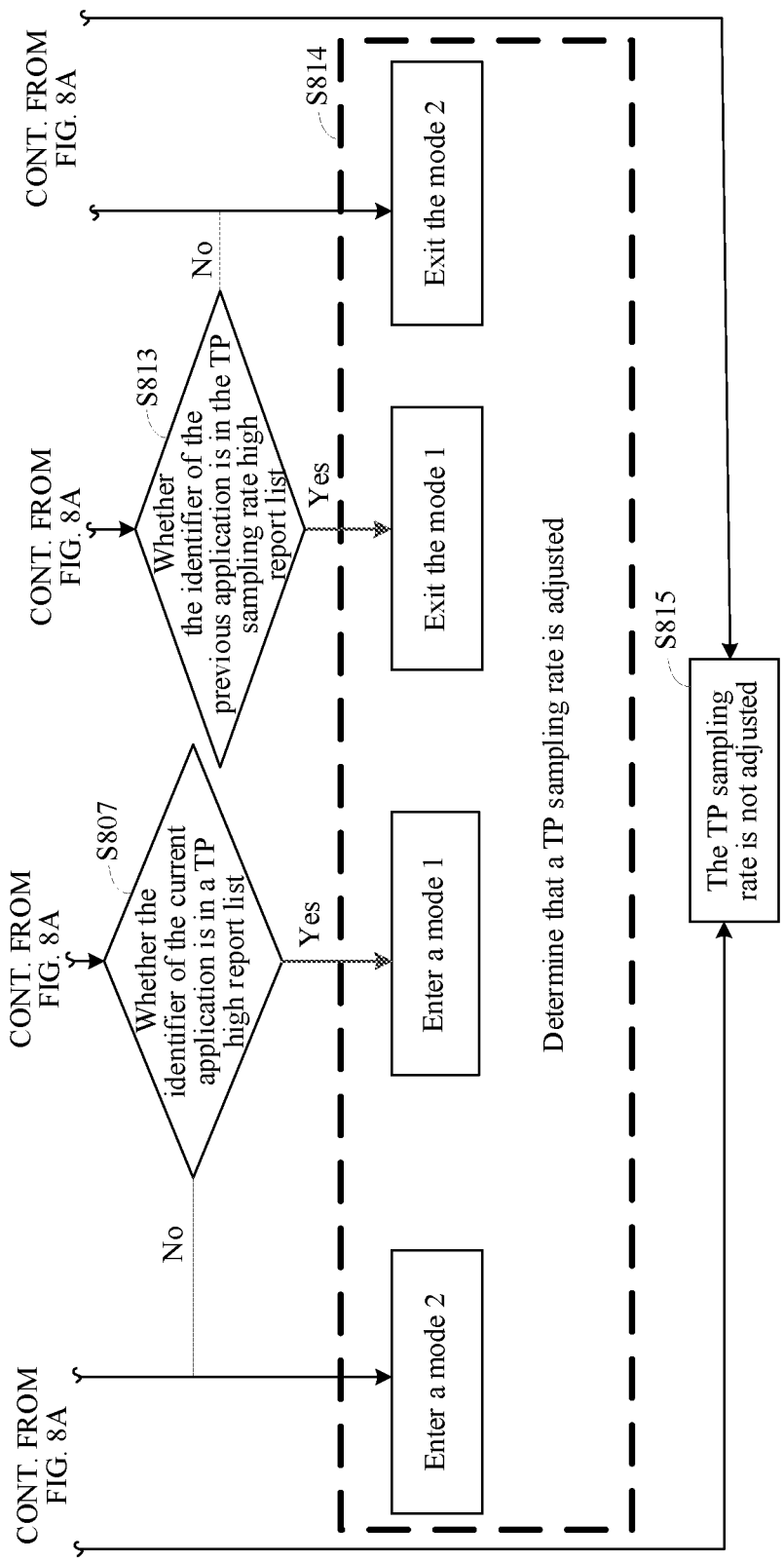

It should be noted that a case that the gesture-following performance control service determines, according to the blacklist, the whitelist, the filtering list, the TP high report list, and the TP broad enable switch, how to adjust the TP sampling rate shown in FIG. 8A and FIG. 8B is merely an exemplary description. The gesture-following performance control service may alternatively determine, according to one or more lists in the preset list, how to adjust the TP sampling rate. This is not limited in this embodiment of this application.

For example, the list used for determining how to adjust the TP sampling rate may include at least the TP high report list.

It may be understood that in a case that the electronic device supports adjustment of the TP sampling rate (for example, the firmware enable switch is on), the gesture-following performance control service controls, depending on whether the current application scenario is the game scenario and whether the identifier of the current application scenario is in the preset list (for example, the target application type list, the blacklist, the whitelist, or the filtering list), the touch panel driver to enter different TP sampling rates under different conditions. That is, a moment of entering a high TP sampling rate and a moment of exiting the high TP sampling rate can be controlled according to a condition of firmware of the mobile phone and a condition of a currently run application. Therefore, on the premise of balancing power consumption and performance of the mobile phone, the gesture-following performance of the mobile phone is improved, and the user experience is improved.

Figure 10A:
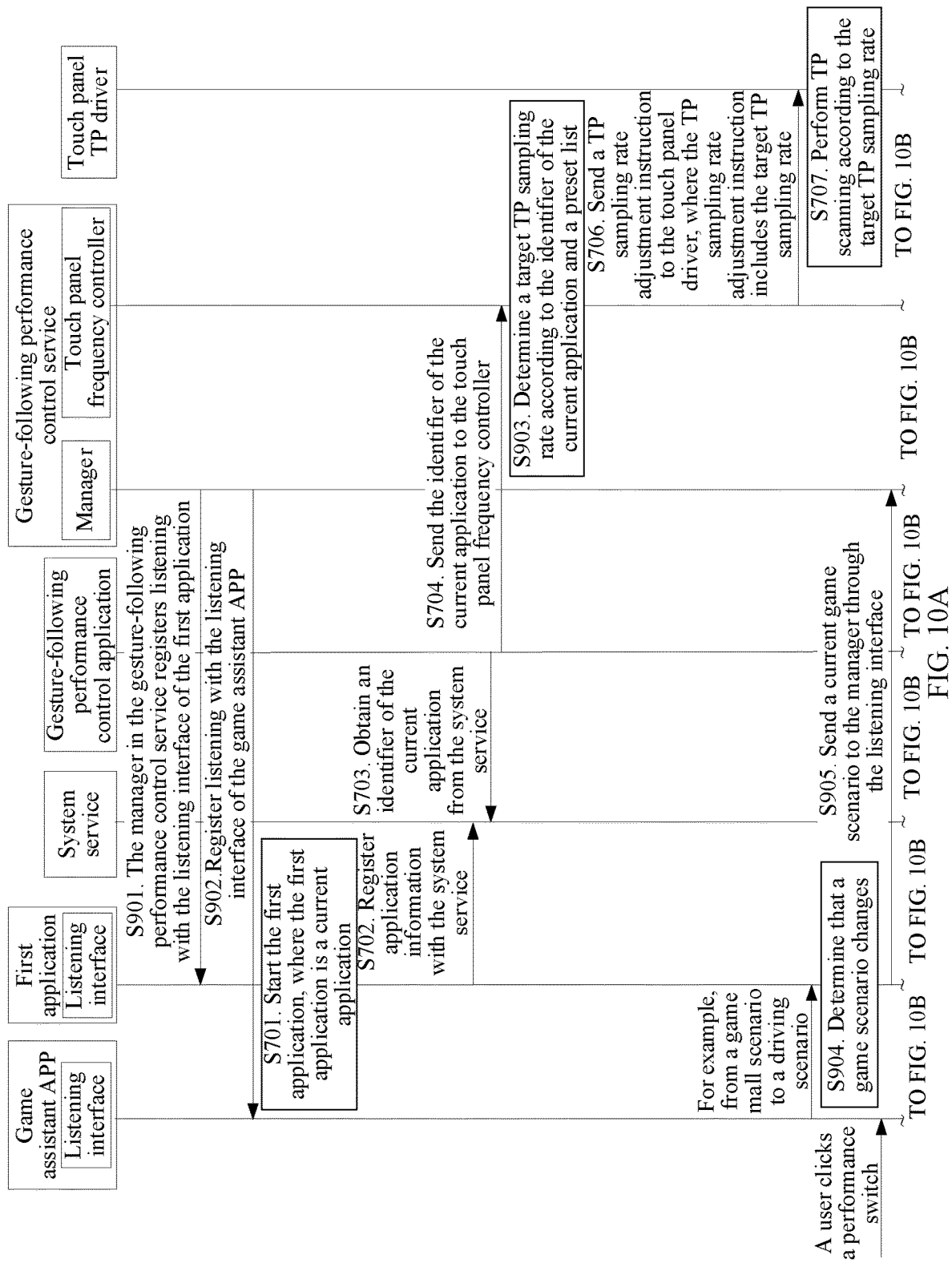
FIG. 10A and FIG. 10B are a fourth flowchart of a method for adjusting a sampling rate of a TP according to an embodiment of this application.
Figure 10B:
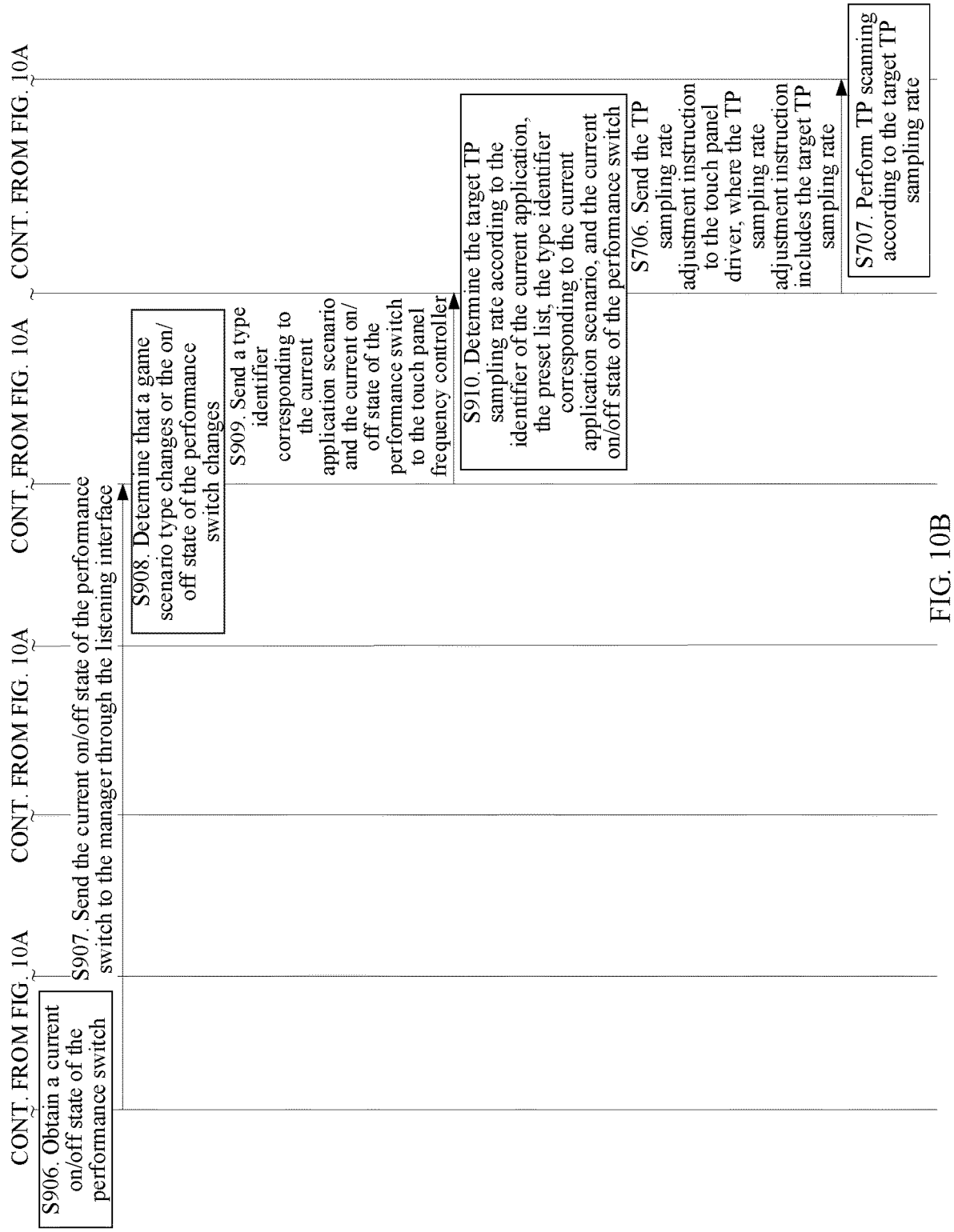

Referring to FIG. 10A and FIG. 10B, a process in which the gesture-following performance control service further determines, according to the current application scenario type and the current on/off state of the performance switch, how to adjust the TP sampling rate in S705 when the application scenario type of the game APP changes or the on/off state of the performance switch changes in addition to adjusting the TP sampling rate for the game APP is described by using an example in which the TP sampling rate is adjusted for the game APP. As shown in FIG. 9A and FIG. 9B, the method may include S901 and S902, and S705 may include S903 to S910.

S901. A manager in the gesture-following performance control service registers listening with a listening interface of the first application.

It should be noted that FIG. 10A and FIG. 10B are merely an exemplary case that the manager registers listening with the listening interface of the game APP, and the manager may also register listening with the listening interface of the game APP after S701. Specifically, for a moment at which the manager registers listening with the listening interface of the game APP, reference may be made to the detailed description that the manager registers listening with the listening interface of the game APP.

S902. The manager in the gesture-following performance control service registers listening with a listening interface of the game assistant APP.

It should be noted that FIG. 10A and FIG. 10B are merely an exemplary case that the manager registers listening with the listening interface of the game assistant APP, and the manager may also register listening with the listening interface of the game assistant APP after S701. Specifically, for a moment at which the manager registers listening with the listening interface of the game assistant APP, reference may be made to the detailed description that the manager registers listening with the listening interface of the game assistant APP.

S903. A touch panel frequency controller in the gesture-following performance control service determines a target TP sampling rate according to the identifier of the current application and the preset list.

Specifically, for a specific process of S903, reference may be made to the detailed description of determining that the TP sampling rate is adjusted in FIG. 8A and FIG. 8B or FIG. 9A and FIG. 9B. Details are not described in this embodiment of this application. The target TP sampling rate determined in S903 may be the first TP sampling rate, the second TP sampling rate, the third TP sampling rate, or the fourth TP sampling rate.

S904. The game APP determines that a game scenario changes.

When determining the game scenario is switched from a first application scenario to a second application scenario, the game APP determines that the game scenario changes, for example, jumping from a loading scenario to a login hall scenario, and jumping from the login hall scenario to a driving scenario.

S905. The game APP sends a current game scenario to the manager through the listening interface.

The current game scenario may be the loading scenario, the login hall scenario, the driving scenario, or the like.

It should be noted that in addition to sending the current game scenario to the manager when determining that the game scenario changes, the game APP may also send the current game scenario to the manager through the listening interface according to a fixed time period.

It should be noted that the first application may perform S904 and S905 after S901 and S701. A sequence of S904 and S905 and any other steps (for example, S702 to S704, S903, S706 and S707 after S903, and S906) than S904 and S905 may vary. This is not limited in this embodiment of this application.

S906. The game assistant APP obtains a current on/off state of the performance switch.

Specifically, in a case that the game assistant APP detects that an operation of controlling the performance switch by the user (for example, a click operation on a performance switch control), it indicates that an on/off state of the performance switch changes, and the game assistant APP obtains a current on/off state of the performance switch.

S907. The game assistant APP sends the current on/off state of the performance switch to the manager through the listening interface.

It should be noted that the game assistant APP may perform S906 and S907 after S902 and S701. A sequence of S906 and S907 and any other steps (for example, S702 to S704, S903, S706 and S707 after S903, and S904 and S905) than S906 and S907 may vary. This is not limited in this embodiment of this application.

S908. The manager in the gesture-following performance control service determines that a game scenario type changes or the on/off state of the performance switch changes.

Specifically, after S905, the manager determines a type identifier corresponding to the current application scenario. Subsequently, in a case that the type identifier corresponding to the current application scenario is different from a stored type identifier of a previous application scenario, the manager determines that the application scenario type changes, and stores the type identifier corresponding to the current application scenario, and S909 is performed. After S907, in a case that the current on/off state of the performance switch is different from a previously stored on/off state of the performance switch, the manager determines that the on/off state of the performance switch changes, and stores the current on/off state of the performance switch, and S909 is performed.

In a case that the type identifier corresponding to the current application scenario is the same as the store type identifier of the previous application scenario or the current on/off state of the performance switch is the same as the previously stored on/off state of the performance switch, the manager continues to obtain a new current application scenario or a new current on/off state of the performance switch.

For example, the application scenario type of the game APP includes the battle scenario and the non-battle scenario. That the manager determines that the game scenario type changes may refer to a change between the battle scenario and the non-battle scenario.

For example, the manager may store a type identifier corresponding to a previous game scenario as false or true. False represents the non-battle scenario, and true represents the battle scenario. If an application scenario type to which a current game scenario belongs is the battle scenario, the manager may determine a type identifier corresponding to the current game scenario as true, and determine whether the type identifier corresponding to the current game scenario is the same as the type identifier corresponding to the previous game scenario. If the application scenario type to which the current game scenario belongs is the non-battle scenario, the manager may determine the type identifier corresponding to the current game scenario as false, and determine whether the type identifier corresponding to the current game scenario is the same as the type identifier corresponding to the previous game scenario. In a case that the type identifier corresponding to the current game scenario is different from the type identifier corresponding to the previous game scenario, it is determined that the game scenario type changes.

After obtaining the type identifier corresponding to the current game scenario, the manager stores the type identifier corresponding to the current game scenario. Before the manager obtains no type identifier corresponding to any game scenario, a default type identifier may be false.

For example, the manager may store a previous status of the performance switch as off or on. off indicates that the status of the performance switch is off, and on indicates that the status of the performance switch is on. If a current on/off state of the performance switch is on, the manager may determine that the current status of the performance switch is on, and determine whether the current status of the performance switch is the same as the previously stored status of the performance switch. If the current on/off state of the performance switch is off, the manager may determine that the current status of the performance switch is off, and determine whether the current status of the performance switch is the same as the previously stored status of the performance switch. In a case that the current status of the performance switch is different from the previously stored status of the performance switch, the status of the performance switch changes.

After obtaining the current status of the performance switch, the manager stores the current status of the performance switch. Before the manager obtains no status of any performance switch, a default status of the performance switch may be off.

S909. The manager in the gesture-following performance control service sends the type identifier corresponding to the current application scenario and the current on/off state of the performance switch to a touch panel frequency controller.

Specifically, when determining that the game scenario type changes or the on/off state of the performance switch changes, the manager in the gesture-following performance control service sends the type identifier corresponding to the current application scenario and the on/off state of the current performance switch to the touch panel frequency controller.

S910. The touch panel frequency controller in the gesture-following performance control service determines the target TP sampling rate according to the identifier of the current application, the preset list, the type identifier corresponding to the current application scenario, and the current on/off state of the performance switch.

Specifically, the touch panel frequency controller determines the target TP sampling rate according to the identifier of the current application, any several lists (for example, the TP high report list and the performance switch maintenance list) in the preset list, the current game scenario, and the current on/off state of the performance switch. Then, after determining the target TP sampling rate by performing S910, the touch panel frequency controller may perform at least S706 and S707.

It should be noted that the target TP sampling rate determined in S910 may be the same as or different from the target TP sampling rate determined in S903.

Figure 11A:
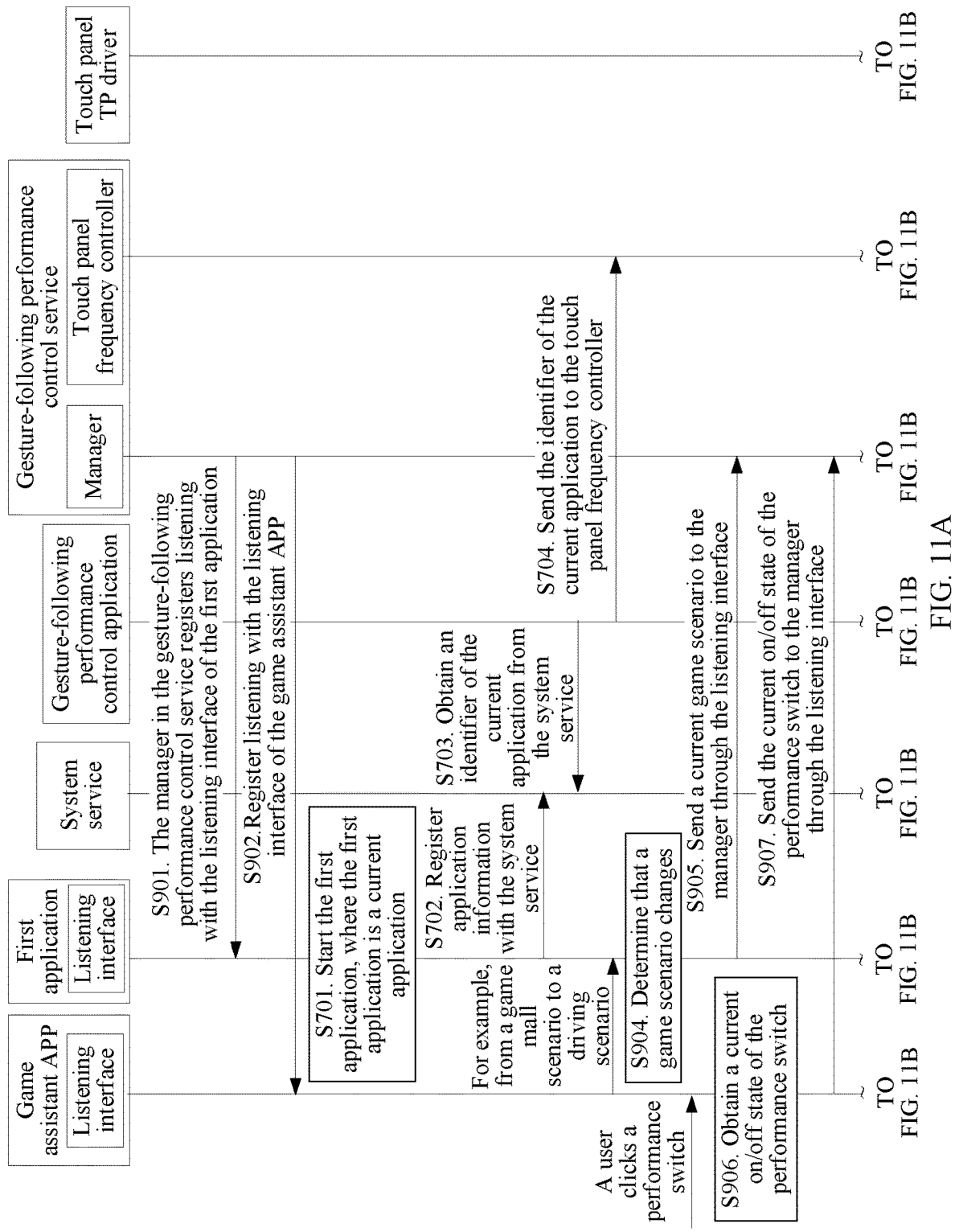

Referring to FIG. 11A and FIG. 11B, a process in which after the game APP is started, the gesture-following performance control service may determine, according to the current application scenario type and the current on/off state of the performance switch, how to adjust the TP sampling rate when determining that the application scenario type of the game APP changes or the on/off state of the performance switch changes is described. As shown in FIG. 11A and FIG. 11B, the method may include S901 and S902, and S705 may include S904 to S910.

Figure 12:
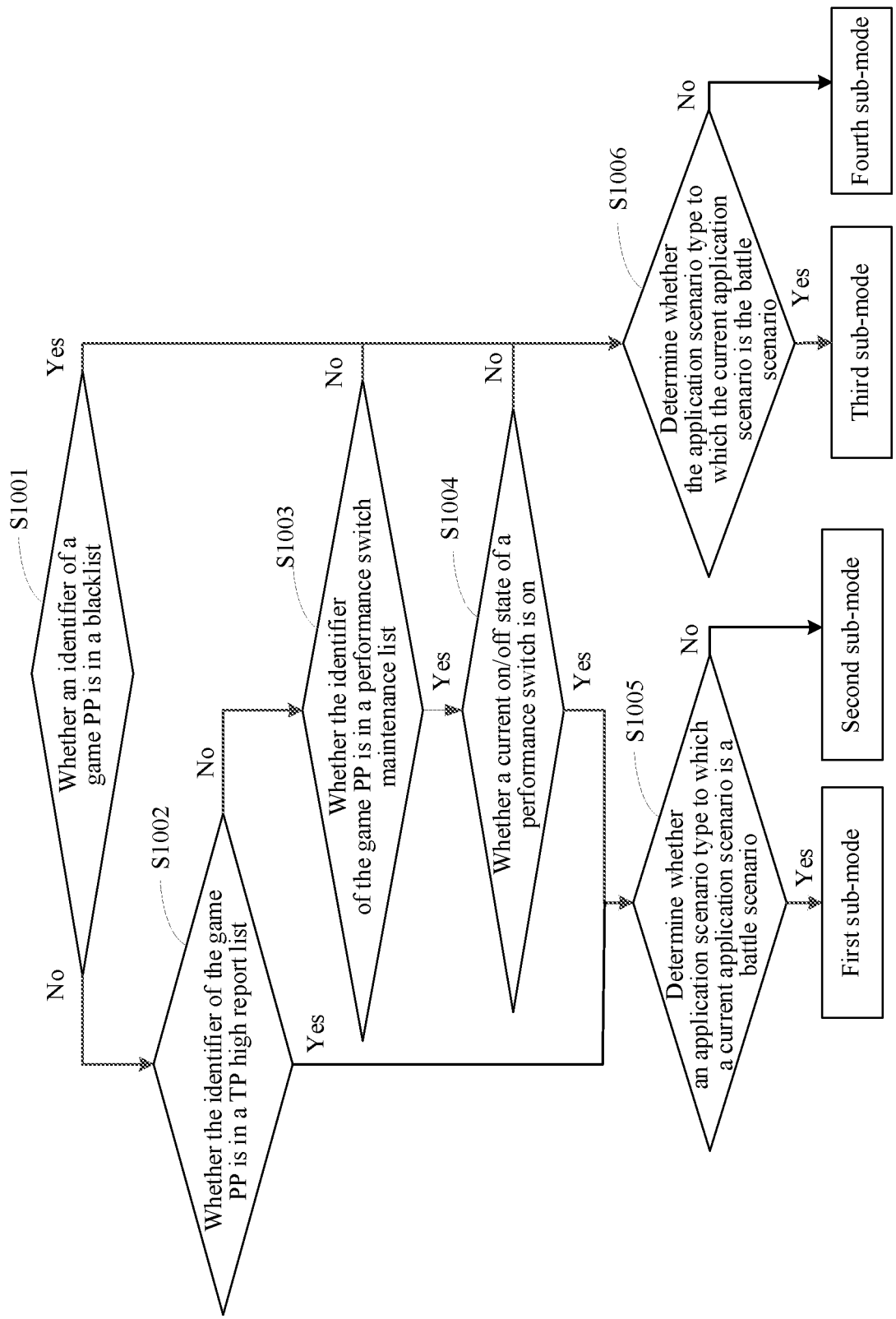
FIG. 12 is a sixth flowchart of a method for adjusting a sampling rate of a TP according to an embodiment of this application.

Further, referring to FIG. 12, the blacklist, the TP high report list, and the maintenance list of the performance switch used in S910 are used as examples, and S910 may include S1001 to S1006

S1001. Determine whether an identifier of a game APP is in the blacklist.

Specifically, when the identifier of the game APP is in the blacklist, it indicates that a requirement of the game APP for the gesture-following performance is relatively low, the touch panel frequency controller in the gesture-following performance control service may perform S1006, that is, determine a TP sampling rate corresponding to a third sub-mode or a fourth sub-mode as the target TP sampling rate according to the type identifier of the current application scenario (that is, the application scenario type to which the current application scenario belongs). The touch panel frequency controller performs S1002 when determining that the identifier of the game APP is not in the blacklist. The TP sampling rate corresponding to the third sub-mode or the fourth sub-mode may be set to be relatively small.

S1002. Determine whether the identifier of the game APP is in the TP high report list.

Specifically, when the identifier of the game APP is in the TP high report list, it indicates that the game APP supports a relatively high TP sampling rate, and the touch panel frequency controller in the gesture-following performance control service may perform S1005, that is, determine a TP sampling rate corresponding to a first sub-mode or a second sub-mode as the target TP sampling rate according to the type identifier of the current application scenario (that is, the application scenario type to which the current application scenario belongs). The touch panel frequency controller may perform S1003 when determining that the identifier of the game APP is not in the TP high report list.

The TP sampling rate corresponding to the first sub-mode or the second sub-mode may be set to be relatively large.

S1003. Determine whether the identifier of the game APP is in the performance switch maintenance list.

Specifically, when the identifier of the game APP is in the performance switch maintenance list, it indicates that the user may improve the gesture-following performance of the game APP through setting of the performance switch, and the touch panel frequency controller in the gesture-following performance control service may perform S1004. The touch panel frequency controller may perform S1006 when determining that the identifier of the game APP is not in the performance switch maintenance list.

S1004. Determine whether the on/off state of the current performance switch is on.

Specifically, when the current on/off state of the performance switch is on, it indicates that the user requires to improve the gesture-following performance of the game APP, and the touch panel frequency controller in the gesture-following performance control service may perform S1005. When the current on/off state of the performance switch is off, it indicates that the user does not require to improve the gesture-following performance of the game APP, and the touch panel frequency controller may perform S1006.

S1005. Determine whether the application scenario type to which the current application scenario is the battle scenario.

Specifically, the touch panel frequency controller may determine the application scenario type to which the current application scenario belongs according to the type identifier corresponding to the current application scenario. If it is determined that the application scenario type to which the current application scenario belongs is the battle scenario, the touch panel frequency controller may adjust the touch panel driver to the first sub-mode, and determine that the target TP sampling rate as the TP sampling rate (that is, the eighth sampling rate) in the first sub-mode. After determining that the application scenario type to which the current application scenario belongs is not the battle scenario, the touch panel frequency controller may adjust the touch panel driver to the second sub-mode, and determine that the target TP sampling rate as the TP sampling rate (that is, the ninth sampling rate) in the second sub-mode.

The TP sampling rate in the first sub-mode is greater than the TP sampling rate in the second sub-mode, and the TP sampling rate in the second sub-mode is greater than or equal to the default TP sampling rate.

S1006. Determine whether the application scenario type to which the current application scenario is the battle scenario.

Specifically, if it is determined that the application scenario type to which the current application scenario belongs is the battle scenario, the touch panel frequency controller may adjust the touch panel driver to the third sub-mode, and determine that the target TP sampling rate as the TP sampling rate (that is, the tenth sampling rate) in the third sub-mode. If it is determined that the application scenario type to which the current application scenario belongs is not the battle scenario, the touch panel frequency controller may adjust the touch panel driver to the fourth sub-mode, and determine that the target TP sampling rate as the TP sampling rate (that is, the eleventh sampling rate) in the fourth sub-mode.

The TP sampling rate in the third sub-mode is greater than the TP sampling rate in the fourth sub-mode, and the TP sampling rate in the fourth sub-mode is greater than or equal to the default TP sampling rate. The TP sampling rate in the first sub-mode is greater than the TP sampling rate in the third sub-mode and the TP sampling rate in the fourth sub-mode.

For example, the TP sampling rate in the first sub-mode may be equal to the first TP sampling rate. The TP sampling rate in the second sub-mode may be equal to the second TP sampling rate. The TP sampling rate in the third sub-mode may be equal to the third TP sampling rate. The TP sampling rate in the fourth sub-mode may be equal to the fourth TP sampling rate.

In the above solution, when a game APP runs, in a case that a mobile phone determines that the mobile phone supports adjustment of a TP sampling rate, the mobile phone controls a moment of entering a high TP sampling rate depending on whether a performance switch is on and according to a specific game scenario type, so that on the premise of balancing power consumption and performance of the mobile phone, gesture-following performance of the mobile phone can be improved. In addition, an on/off state of the performance switch is usually controlled by a user. Therefore, the user can further indirectly adjust the TP sampling rate, to improve the user experience.

It should be noted that the foregoing embodiments are described by using an example in which the TP sampling rate is adjusted for the game APP. It may be understood that when running another application, the mobile phone may also adjust a TP sampling rate according to the method when the another application runs, so that on the premise of balancing the power consumption and the performance of the mobile phone, the gesture-following performance of the mobile phone is improved.

In addition, in the foregoing embodiments, a description is made by using an example in which the application in the mobile phone is in a running state. It may be understood that the method for adjusting a TP sampling rate is further applicable to an electronic device such as an in-vehicle device, a tablet computer, or a watch. All the devices may be configured to implement the method for adjusting a TP sampling rate in the foregoing embodiments. This is not limited in this embodiment of this application.

Some embodiments of this application provide an electronic device. The electronic device may include: a touch panel, a memory, and one or more processors. The touch panel and the memory are coupled to the processors. The memory is configured to store computer program code, where the computer program code includes computer instructions. When the processors execute the computer instructions, the electronic device may perform various functions or steps performed by the electronic device in the method embodiments. A structure of the electronic device may refer to the structure of the electronic device 100 in FIG. 1.

Figure 13:
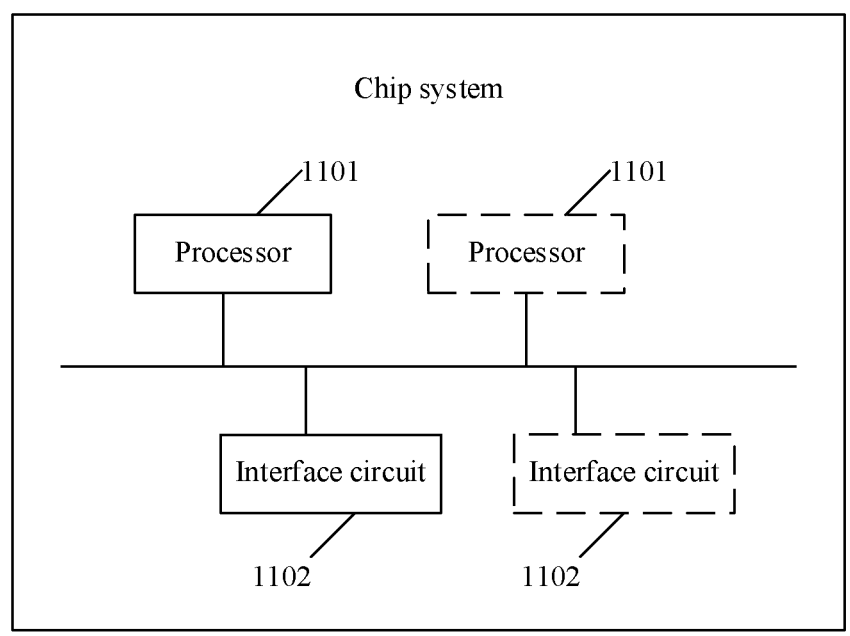
FIG. 13 is a schematic structural diagram of a chip system according to an embodiment of this application.

An embodiment of this application further provides a chip system. As shown in FIG. 13, the chip system includes at least one processor 1101 and at least one interface circuit 1102. The processor 1101 and the interface circuit 1102 may be interconnected by a line. For example, the interface circuit 1102 may be configured to receive a signal from another apparatus (such as a memory of the electronic device). In another example, the interface circuit 1102 may be configured to send a signal to another apparatus (for example, the processor 1101 or the touch panel of the electronic device). For example, the interface circuit 1102 may read instructions stored in the memory and send the instructions to the processor 1101. The instructions, when executed by the processor 1101, may cause the electronic device to perform the steps in the foregoing embodiments. Certainly, the chip system may further include other discrete devices. This is not specifically limited in this embodiment of this application.

An embodiment of this application further provides a computer-readable storage medium, including computer instructions, where the computer instructions, when run on the electronic device, causes the electronic device to perform various functions or steps performed by the electronic device in the foregoing method embodiments.

An embodiment of this application further provides a computer program product. The computer program product, when run on an electronic device, causes the electronic device to perform various functions or steps performed by the electronic device in the foregoing method embodiments.

The foregoing description about implementations allows a person skilled in the art to understand that, for the purpose of convenient and brief description, division of the foregoing functional modules is taken as an example for illustration. In actual application, the foregoing functions can be allocated to different functional modules and implemented according to a requirement, that is, an internal structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may be one or more physical units, may be located in one place, or may be distributed in multiple different places. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of the present application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or a compact disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for adjusting a touch panel (TP) sampling rate, applicable to an electronic device, wherein the electronic device comprises a TP, a first application is installed on the electronic device, and the method comprises:
   starting a first application;
   obtaining an identifier of the first application;
   displaying a first interface of the first application; and
   receiving a second operation inputted by a user in the first interface, and displaying an icon of a performance switch control in response to the second operation;
   receiving a first operation inputted by a user, wherein the first operation corresponds to the performance switch control;
   obtaining a status of the performance switch control in response to the first operation;
   determining a TP sampling rate as a first sampling rate according to the identifier of the first application in a case that the status of the performance switch control changes, and scanning a touch operation on the TP based on the first sampling rate;
   scanning a touch operation on the TP by adopting the first sampling rate under a first application scenario of the first application;
   determining, when it is detected that an application scenario of the first application is switched from the first application scenario to a second application scenario, that the application scenario of the first application changes, wherein the first application scenario corresponds to a first application scenario type, and the second application scenario corresponds to a second application scenario type, wherein the application scenario type comprises a battle scenario and a non-battle scenario, the first application scenario type is the non-battle scenario, and the second application scenario type is the battle scenario;
   determining that an application scenario type of the first application changes;
   storing the second application scenario type;
   determining the TP sampling rate as a second sampling rate according to the identifier of the first application, the second application scenario type, and the status of the performance switch control; and
   scanning the touch operation on the TP based on the second sampling rate.

2. The method according to claim 1, wherein after the identifier of the first application, the method further comprises:
   determining that the electronic device supports adjustment of the TP sampling rate;
   determining whether a type of the first application is a game application type based on the identifier of the first application;
   determining, according to the identifier of the first application in a case that the type of the first application is the game application type, whether the first application meets a first preset condition, wherein the first preset condition is set based on at least one preset list, the at least one preset list comprises a TP high report list, the TP high report list comprises a plurality of application identifiers, and applications corresponding to the plurality of application identifiers in the TP high report list support a TP sampling rate greater than a first threshold; and
   scanning the touch operation on the TP according to the following:
      determining the TP sampling rate as a third sampling rate when the first application meets the first preset condition and scanning the touch operation on the TP based on the third sampling rate;
determining the TP sampling rate as a fourth sampling rate when the first application does not meet the first preset condition, and scanning the touch operation on the TP based on the fourth sampling rate, wherein the third sampling rate is greater than the fourth sampling rate; or
scanning the touch operation on the TP based on a fifth sampling rate when the first application does not meet the first preset condition, wherein the fifth sampling rate is a sampling rate obtained for the TP sampling rate before the first application is started.

3. The method according to claim 2, further comprising:
obtaining an identifier of a second application in a case that the type of the first application is not the game application type, wherein the second application is an application running in a foreground of the electronic device before the first application runs in the foreground;
determining, according to the identifier of the second application, whether the second application meets the first preset condition; and
scanning the touch operation on the TP according to the following:
   determining the TP sampling rate as a sixth sampling rate when the second application meets the first preset condition, and scanning the touch operation on the TP based on the sixth sampling rate, wherein the third sampling rate is greater than the sixth sampling rate;
   determining the TP sampling rate as a seventh sampling rate when the second application does not meet the first preset condition, and scanning the touch operation on the TP based on the seventh sampling rate, wherein the third sampling rate is greater than the seventh sampling rate; or
   scanning the touch operation on the TP based on the fifth sampling rate when the second application does not meet the first preset condition.

4. The method according to claim 1, wherein before the first operation by the user is received, the status of the performance switch control is an off state, and the first operation is used for changing the status of the performance switch control from the off state to an on state; and
before the receiving a first operation by a user, the determining the TP sampling rate as a second sampling rate according to the identifier of the first application, the second application scenario type, and the status of the performance switch control comprises: determining the TP sampling rate as the second sampling rate according to the identifier of the first application, the second application scenario type, and the off state of the performance switch control.

5. The method according to claim 1, wherein before the first operation by the user is received, the status of the performance switch control is an off state, and the first operation is used for changing the status of the performance switch control from the off state to an on state;
obtaining the status of the performance switch control in response to the first operation comprises: obtaining the status of the performance switch control as the on state in response to the first operation; and
after receiving the first operation by a user, determining the TP sampling rate as the second sampling rate according to the identifier of the first application, the second application scenario type, and the status of the performance switch control comprises: determining the TP sampling rate as the second sampling rate according to the identifier of the first application, the second application scenario type, and the on state of the performance switch control.

6. The method according to claim 1, wherein determining the TP sampling rate as the second sampling rate according to the identifier of the first application, the second application scenario type, and the status of the performance switch control comprises:
determining that the electronic device supports adjustment of the TP sampling rate;
determining that a type of the first application is a game application type based on the identifier of the first application; and
determining the TP sampling rate by:
   determining the TP sampling rate as an eighth sampling rate when it is determined that the identifier of the first application, the second application scenario type, and the status of the performance switch control meet a second preset condition;
   determining the TP sampling rate as a ninth sampling rate when it is determined that the identifier of the first application, the second application scenario type, and the status of the performance switch control meet a third preset condition, wherein the eighth sampling rate is greater than the ninth sampling rate;
   determining the TP sampling rate as a tenth sampling rate when it is determined that the identifier of the first application, the second application scenario type, and the status of the performance switch control meet a fourth preset condition, wherein the eighth sampling rate is greater than the tenth sampling rate; and
   determining the TP sampling rate as an eleventh sampling rate when it is determined that the identifier of the first application, the second application scenario type, and the status of the performance switch control meet a fifth preset condition, wherein the eighth sampling rate is greater than the eleventh sampling rate.

7. The method of claim 6, wherein the second preset condition comprises that: the identifier of the first application is not in a first list, the identifier of the first application is in a second list, and the second application scenario type is a battle scenario; or the second preset condition comprises that: the identifier of the first application is not in a first list, the identifier of the first application is not in a second list, the identifier of the first application is in a third list, the status of the performance switch control is an on state, and the second application scenario type is a battle scenario;
the third preset condition comprises that: the identifier of the first application is not in the first list, the identifier of the first application is in the second list, and the second application scenario type is a non-battle scenario; or the third preset condition comprises that: the identifier of the first application is not in the first list, the identifier of the first application is not in the second list, the identifier of the first application is in the third list, the status of the performance switch control is the on state, and the second application scenario type is a non-battle scenario;
the fourth preset condition comprises that: the identifier of the first application is in the first list, and the second application scenario type is the battle scenario; or if it is determined that the identifier of the first application is not in the first list, the identifier of the first application is not in the second list, the identifier of the first application is not in the third list, and the second application scenario type is the battle scenario; or the fourth preset condition comprises that: the identifier of the first application is not in the first list, the identifier of the first application is not in the second list, the identifier of the first application is in the third list, the status of the performance switch control is an off state, and the second application scenario type is the battle scenario;

the fifth preset condition comprises that: the identifier of the first application is in the first list, and the second application scenario type is in the non-battle scenario; or if it is determined that the identifier of the first application is not in the first list, the identifier of the first application is not in the second list, the identifier of the first application is not in the third list, and the second application scenario type is the non-battle scenario; or the fifth preset condition comprises that: the identifier of the first application is not in the first list, the identifier of the first application is not in the second list, the identifier of the first application is in the third list, the status of the performance switch control is the off state, and the second application scenario type is the non-battle scenario, wherein the first list comprises a plurality of application identifiers, and applications corresponding to the plurality of application identifiers in the first list have low requirements for gesture-following performance; the second list comprises a plurality of application identifiers, and applications corresponding to the plurality of application identifiers in the second list support a TP sampling rate greater than a first threshold; and the third list comprises a plurality of application identifiers, and applications corresponding to the plurality of application identifiers in the third list support adjustment of the TP sampling rate by using the performance switch control.

8. The method according to claim 2, wherein the at least one preset list further comprises: a first list, a fourth list, and a fifth list; the first list comprises a plurality of application identifiers, and applications corresponding to the plurality of application identifiers in the first list have low requirements for gesture-following performance; the fourth list comprises a plurality of application identifiers, and applications corresponding to the plurality of application identifiers in the fourth list have high requirements for the gesture-following performance; the fifth list comprises a plurality of application identifiers, and applications corresponding to the plurality of application identifiers in the fifth list do not support the third sampling rate;

the electronic device further comprises a TP broad enable switch, and the TP broad enable switch is configured to manage whether the electronic device opens a game special effect; and the first preset condition is set based on the at least one preset list and a status of the TP broad enable switch.

9. An electronic device, comprising a touch panel (TP), a memory, and one or more processors, wherein the touch panel and the memory are coupled to the processors; the memory stores computer program code, wherein the computer program code comprises computer instructions;

when the processors execute the computer instructions, the electronic device performs the following operations:
starting a first application;
obtaining an identifier of the first application;
displaying a first interface of the first application; and
receiving a second operation inputted by a user in the first interface, and displaying an icon of a performance switch control in response to the second operation;
receiving a first operation inputted by a user, wherein the first operation corresponds to the performance switch control;
obtaining a status of the performance switch control in response to the first operation;
determining a TP sampling rate as a first sampling rate according to the identifier of the first application in a case that the status of the performance switch control changes, and scanning a touch operation on the TP based on the first sampling rate;
scanning a touch operation on the TP by adopting the first sampling rate under a first application scenario of the first application;
determining, when it is detected that an application scenario of the first application is switched from the first application scenario to a second application scenario, that the application scenario of the first application changes, wherein the first application scenario corresponds to a first application scenario type, and the second application scenario corresponds to a second application scenario type, wherein the application scenario type comprises a battle scenario and a non-battle scenario, the first application scenario type is the non-battle scenario, and the second application scenario type is the battle scenario;
determining that an application scenario type of the first application changes;
storing the second application scenario type;
determining the TP sampling rate as a second sampling rate according to the identifier of the first application, the second application scenario type, and the status of the performance switch control; and
scanning the touch operation on the TP based on the second sampling rate.

10. The electronic device according to claim 9, wherein when the processors execute the computer instructions, the electronic device performs the following further operations:
after obtaining an identifier of the first application, determining that the electronic device supports adjustment of the TP sampling rate;
determining whether a type of the first application is a game application type based on the identifier of the first application;
determining, according to the identifier of the first application in a case that the type of the first application is the game application type, whether the first application meets a first preset condition, wherein the first preset condition is set based on at least one preset list, the at least one preset list comprises a TP high report list, the TP high report list comprises a plurality of application identifiers, and applications corresponding to the plurality of application identifiers in the TP high report list support a TP sampling rate greater than a first threshold; and
scanning the touch operation on the TP according to the following:
determining the TP sampling rate as a third sampling rate when the first application meets the first preset condition and scanning the touch operation on the TP based on the third sampling rate;
determining the TP sampling rate as a fourth sampling rate when the first application does not meet the first preset condition, and scanning the touch operation on the TP based on the fourth sampling rate, wherein the third sampling rate is greater than the fourth sampling rate; or scanning the touch operation on the TP based on a fifth sampling rate when the first application does not meet the first preset condition, wherein the fifth sampling rate is a sampling rate obtained for the TP sampling rate before the first application is started.

11. The electronic device according to claim 10, wherein when the processors execute the computer instructions, the electronic device performs the following further operations:

obtaining an identifier of a second application in a case that the type of the first application is not the game application type, wherein the second application is an application running in a foreground of the electronic device before the first application runs in the foreground;

determining, according to the identifier of the second application, whether the second application meets the first preset condition; and scanning the touch operation on the TP according to the following:

determining the TP sampling rate as a sixth sampling rate when the second application meets the first preset condition, and scanning the touch operation on the TP based on the sixth sampling rate, wherein the third sampling rate is greater than the sixth sampling rate;

determining the TP sampling rate as a seventh sampling rate when the second application does not meet the first preset condition, and scanning the touch operation on the TP based on the seventh sampling rate, wherein the third sampling rate is greater than the seventh sampling rate; or scanning the touch operation on the TP based on the fifth sampling rate when the second application does not meet the first preset condition.

12. The electronic device according to claim 9, wherein before the first operation by the user is received, the status of the performance switch control is an off state, and the first operation is used for changing the status of the performance switch control from the off state to an on state; and before receiving the first operation by the user, determining the TP sampling rate as the second sampling rate according to the identifier of the first application, the second application scenario type, and the status of the performance switch control comprises: determining the TP sampling rate as the second sampling rate according to the identifier of the first application, the second application scenario type, and the off state of the performance switch control.

13. The electronic device according to claim 9, wherein before the first operation by the user is received, the status of the performance switch control is an off state, and the first operation is used for changing the status of the performance switch control from the off state to an on state;

obtaining the status of the performance switch control in response to the first operation comprises: obtaining the status of the performance switch control as the on state in response to the first operation; and after receiving the first operation by the user, determining the TP sampling rate as the second sampling rate according to the identifier of the first application, the second application scenario type, and the status of the performance switch control comprises: determining the TP sampling rate as the second sampling rate according to the identifier of the first application, the second application scenario type, and the on state of the performance switch control.

14. The electronic device according to claim 9, wherein determining the TP sampling rate as the second sampling rate according to the identifier of the first application, the second application scenario type, and the status of the performance switch control comprises:

determining that the electronic device supports adjustment of the TP sampling rate;

determining that a type of the first application is a game application type based on the identifier of the first application; and determining the TP sampling rate by:

determining the TP sampling rate as an eighth sampling rate when it is determined that the identifier of the first application, the second application scenario type, and the status of the performance switch control meet a second preset condition;

determining the TP sampling rate as a ninth sampling rate when it is determined that the identifier of the first application, the second application scenario type, and the status of the performance switch control meet a third preset condition, wherein the eighth sampling rate is greater than the ninth sampling rate;

determining the TP sampling rate as a tenth sampling rate when it is determined that the identifier of the first application, the second application scenario type, and the status of the performance switch control meet a fourth preset condition, wherein the eighth sampling rate is greater than the tenth sampling rate; and determining the TP sampling rate as an eleventh sampling rate when it is determined that the identifier of the first application, the second application scenario type, and the status of the performance switch control meet a fifth preset condition, wherein the eighth sampling rate is greater than the eleventh sampling rate.

15. A non-transitory computer-readable storage medium, comprising computer instructions, wherein the computer instructions, when run on an electronic device, cause the electronic device to perform the following operations:

starting a first application;

obtaining an identifier of the first application;

displaying a first interface of the first application; and receiving a second operation inputted by a user in the first interface, and displaying an icon of a performance switch control in response to the second operation;

receiving a first operation inputted by a user in the first interface, wherein the first operation corresponds to the performance switch control;

obtaining a status of the performance switch control in response to the first operation;

determining a TP sampling rate as a first sampling rate according to the identifier of the first application in a case that the status of the performance switch control changes, and scanning a touch operation on the TP based on the first sampling rate;

scanning a touch operation on the TP by adopting the first sampling rate under a first application scenario of the first application;

determining, when it is detected that an application scenario of the first application is switched from the first application scenario to a second application scenario, that the application scenario of the first application changes, wherein the first application scenario corresponds to a first application scenario type, and the second application scenario corresponds to a second application scenario type, wherein the application scenario type comprises a battle scenario and a non-battle scenario, the first application scenario type is the non-battle scenario, and the second application scenario type is the battle scenario;
  determining that an application scenario type of the first application changes;
  storing the second application scenario type;
  determining the TP sampling rate as a second sampling rate according to the identifier of the first application, the second application scenario type, and the status of the performance switch control; and
  scanning the touch operation on the TP based on the second sampling rate.

16. The non-transitory computer-readable storage medium according to claim 15, wherein the computer instructions, when run on the electronic device, cause the electronic device to perform the following further operations:
  after the obtaining an identifier of the first application, determining that the electronic device supports adjustment of the TP sampling rate;
  determining whether a type of the first application is a game application type based on the identifier of the first application;
  determining, according to the identifier of the first application in a case that the type of the first application is the game application type, whether the first application meets a first preset condition, wherein the first preset condition is set based on at least one preset list, the at least one preset list comprises a TP high report list, the TP high report list comprises a plurality of application identifiers, and applications corresponding to the plurality of application identifiers in the TP high report list support a TP sampling rate greater than a first threshold; and
  scanning the touch operation on the TP according to the following:
    determining the TP sampling rate as a third sampling rate when the first application meets the first preset condition and scanning the touch operation on the TP based on the third sampling rate;
    determining the TP sampling rate as a fourth sampling rate when the first application does not meet the first preset condition, and scanning the touch operation on the TP based on the fourth sampling rate, wherein the third sampling rate is greater than the fourth sampling rate; or
    scanning the touch operation on the TP based on a fifth sampling rate when the first application does not meet the first preset condition, wherein the fifth sampling rate is a sampling rate obtained for the TP sampling rate before the first application is started.

17. The non-transitory computer-readable storage medium according to claim 16, wherein the computer instructions, when run on the electronic device, cause the electronic device to perform the following further operations:
  obtaining an identifier of a second application in a case that the type of the first application is not the game application type, wherein the second application is an application running in a foreground of the electronic device before the first application runs in the foreground;
  determining, according to the identifier of the second application, whether the second application meets the first preset condition; and
  scanning the touch operation on the TP according to the following:
    determining the TP sampling rate as a sixth sampling rate when the second application meets the first preset condition, and scanning the touch operation on the TP based on the sixth sampling rate, wherein the third sampling rate is greater than the sixth sampling rate;
    determining the TP sampling rate as a seventh sampling rate when the second application does not meet the first preset condition, and scanning the touch operation on the TP based on the seventh sampling rate, wherein the third sampling rate is greater than the seventh sampling rate; or
    scanning the touch operation on the TP based on the fifth sampling rate when the second application does not meet the first preset condition.

18. The non-transitory computer-readable storage medium according to claim 15, wherein before the first operation by the user is received, the status of the performance switch control is an off state, and the first operation is used for changing the status of the performance switch control from the off state to an on state; and
  before receiving the first operation by the user, the determining the TP sampling rate as a second sampling rate according to the identifier of the first application, the second application scenario type, and the status of the performance switch control comprises: determining the TP sampling rate as the second sampling rate according to the identifier of the first application, the second application scenario type, and the off state of the performance switch control.

19. The non-transitory computer-readable storage medium according to claim 15, wherein before the first operation by the user is received, the status of the performance switch control is an off state, and the first operation is used for changing the status of the performance switch control from the off state to an on state;
  obtaining the status of the performance switch control in response to the first operation comprises: obtaining the status of the performance switch control as the on state in response to the first operation; and
  after the receiving a first operation by a user, the determining the TP sampling rate as a second sampling rate according to the identifier of the first application, the second application scenario type, and the status of the performance switch control comprises: determining the TP sampling rate as the second sampling rate according to the identifier of the first application, the second application scenario type, and the on state of the performance switch control.

20. The non-transitory computer-readable storage medium according to claim 15, wherein determining the TP sampling rate as the second sampling rate according to the identifier of the first application, the second application scenario type, and the status of the performance switch control comprises:
  determining that the electronic device supports adjustment of the TP sampling rate;
  determining that a type of the first application is a game application type based on the identifier of the first application; and determining the TP sampling rate by:
- determining the TP sampling rate as an eighth sampling rate when it is determined that the identifier of the first application, the second application scenario type, and the status of the performance switch control meet a second preset condition;
- determining the TP sampling rate as a ninth sampling rate when it is determined that the identifier of the first application, the second application scenario type, and the status of the performance switch control meet a third preset condition, wherein the eighth sampling rate is greater than the ninth sampling rate;
- determining the TP sampling rate as a tenth sampling rate when it is determined that the identifier of the first application, the second application scenario type, and the status of the performance switch control meet a fourth preset condition, wherein the eighth sampling rate is greater than the tenth sampling rate; and
- determining the TP sampling rate as an eleventh sampling rate when it is determined that the identifier of the first application, the second application scenario type, and the status of the performance switch control meet a fifth preset condition, wherein the eighth sampling rate is greater than the eleventh sampling rate.

* * * * *

UNITED STATES PATENT AND TRADEMARK OFFICE
CERTIFICATE OF CORRECTION

| | | |
|---|---|---|
| PATENT NO. | : 12,493,377 B2 | Page 1 of 1 |
| APPLICATION NO. | : 18/029713 | |
| DATED | : December 9, 2025 | |
| INVENTOR(S) | : Shan et al. | |

It is certified that error appears in the above-identified patent and that said Letters Patent is hereby corrected as shown below:

In the Claims

In Column 42, in Claim 2, Line 45, delete "after the" and insert -- after obtaining the --.

Signed and Sealed this
Tenth Day of February, 2026

John A. Squires
*Director of the United States Patent and Trademark Office*